(12) United States Patent
Takahashi et al.

(10) Patent No.: US 7,376,725 B2
(45) Date of Patent: May 20, 2008

(54) ACCESS CONTROL SYSTEM, ACCESSED TERMINAL, ACCESS TERMINAL AND PROGRAM FOR TERMINAL, AND ACCESS CONTROL METHOD

(75) Inventors: Yusuke Takahashi, Suwa (JP); Hozumi Mori, Beppu (JP); Senichi Mokuya, Suwa (JP)

(73) Assignee: Seiko Epson Corporation (JP)

( * ) Notice: Subject to any disclaimer, the term of this patent is extended or adjusted under 35 U.S.C. 154(b) by 967 days.

(21) Appl. No.: 10/755,711

(22) Filed: Jan. 9, 2004

(65) Prior Publication Data

US 2004/0215759 A1 Oct. 28, 2004

(30) Foreign Application Priority Data

Jan. 9, 2003 (JP) ............................. 2003-003141
Oct. 17, 2003 (JP) ............................. 2003-358374

(51) Int. Cl.
*G06F 15/16* (2006.01)
*G06F 17/00* (2006.01)
(52) U.S. Cl. ...................................... 709/223; 709/250
(58) Field of Classification Search ................ 709/223, 709/224, 227, 249, 229, 226, 250
See application file for complete search history.

(56) References Cited

U.S. PATENT DOCUMENTS

| 6,145,001 | A * | 11/2000 | Scholl et al. ................ 709/223 |
| 7,254,607 | B2 * | 8/2007 | Hubbard et al. ............. 709/203 |
| 2002/0055995 | A1 * | 5/2002 | Beckwith et al. ........... 709/223 |
| 2002/0069281 | A1 * | 6/2002 | Dillenberger et al. ....... 709/226 |
| 2003/0115314 | A1 * | 6/2003 | Kawashima ................ 709/224 |
| 2003/0126251 | A1 * | 7/2003 | Chen et al. .................. 709/223 |
| 2003/0149765 | A1 * | 8/2003 | Hubbard et al. ............. 709/224 |
| 2004/0024853 | A1 * | 2/2004 | Cates et al. ................. 709/223 |

FOREIGN PATENT DOCUMENTS

| JP | 08-161134 | 6/1996 |
| JP | 2000-181653 | 6/2000 |

OTHER PUBLICATIONS

U.S. Appl. No. 10/742,699, filed Dec. 19, 2003.
U.S. Appl. No. 10/747,815, filed Dec. 29, 2003.
U.S. Appl. No. 10/747,817, filed Dec. 29, 2003.
U.S. Appl. No. 10/747,814, filed Dec. 29, 2003.

* cited by examiner

*Primary Examiner*—Zarni Maung
(74) *Attorney, Agent, or Firm*—Harness, Dickey & Pierce, P.L.C.

(57) ABSTRACT

An access control system is provided which is suitable for inhibiting an increase in communication traffic, and preventing excessive process loads applied to certain terminals and certain devices. A printer management server notifies a server printer of timing information indicating access timing corresponding to a server printer with reference to a timing information registration table. A network printer receives timing information, and sends status information of a status information registration table for collection based on the received timing information when the network printer itself is the server printer.

4 Claims, 21 Drawing Sheets

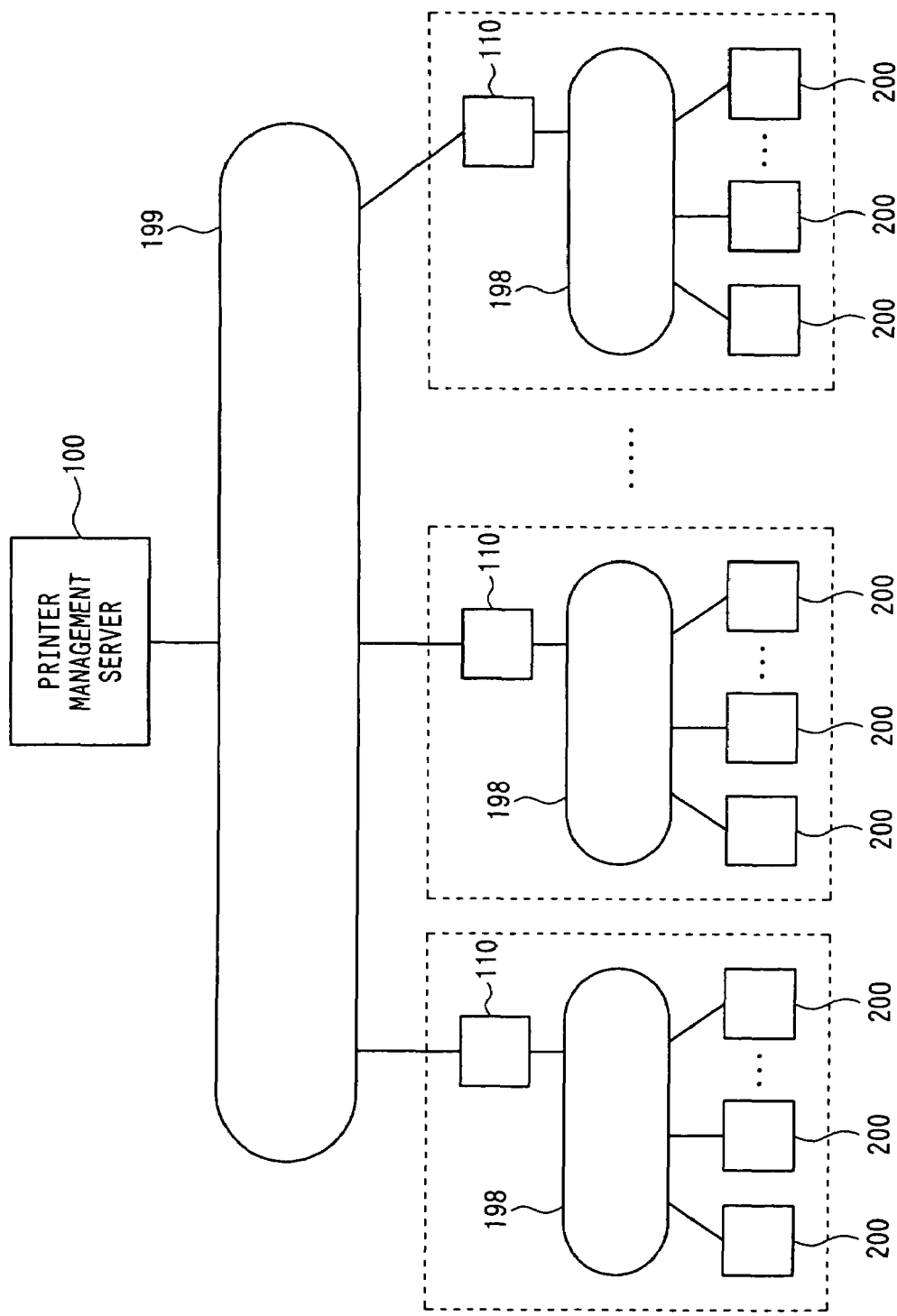

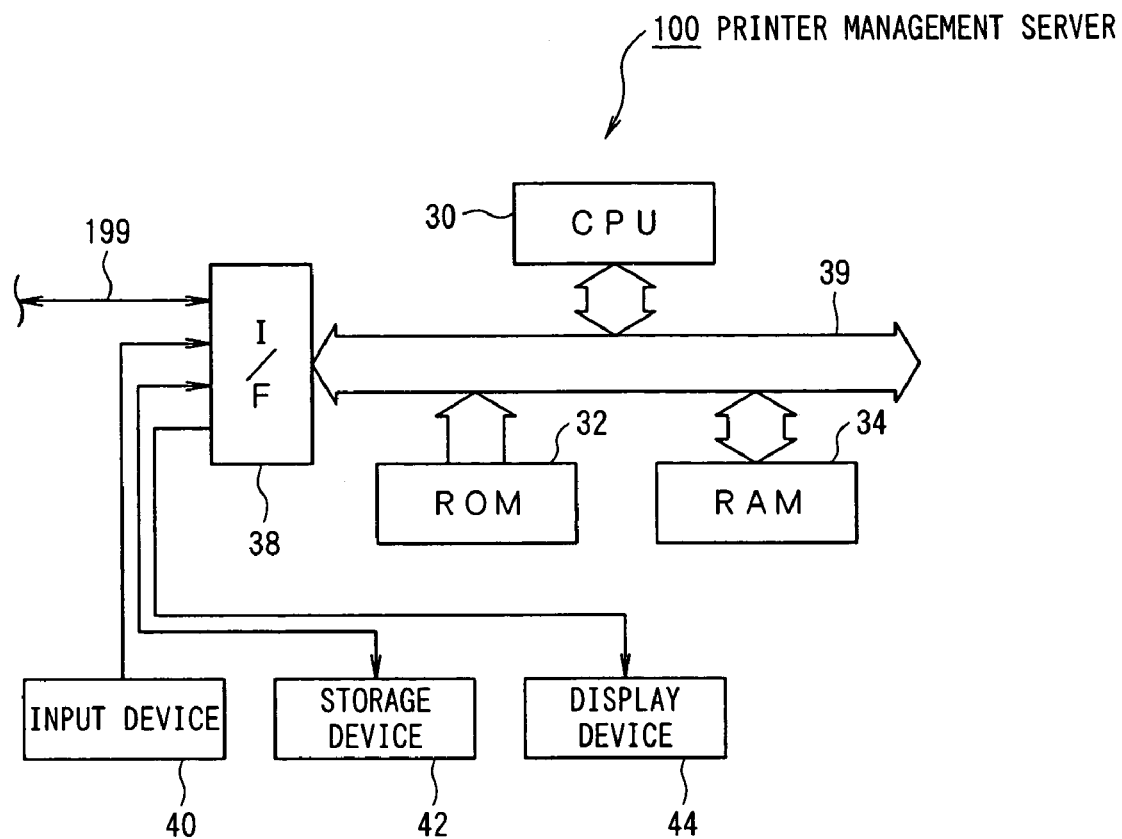

FIG. 4

410 TIMING INFORMATION REGISTRATION TABLE

| IP ADDRESS | PRINTER NAME | NOTIFICATION DATE AND TIME |
|---|---|---|
| xxx.xxx.xxx.1 | LP-9600 | MONDAY 13:00:00 |
| xxx.xxx.yyy.5 | LP-8000C | MONDAY 13:00:05 |
| xxx.xxx.zzz.6 | LP-8500 | MONDAY 13:00:10 |

412, 414, 416

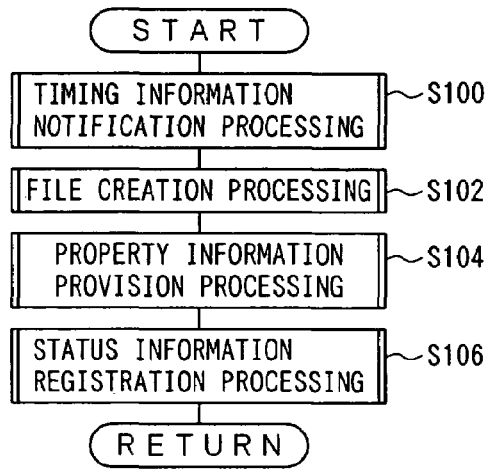

FIG. 5

START
- TIMING INFORMATION NOTIFICATION PROCESSING — S100
- FILE CREATION PROCESSING — S102
- PROPERTY INFORMATION PROVISION PROCESSING — S104
- STATUS INFORMATION REGISTRATION PROCESSING — S106

RETURN

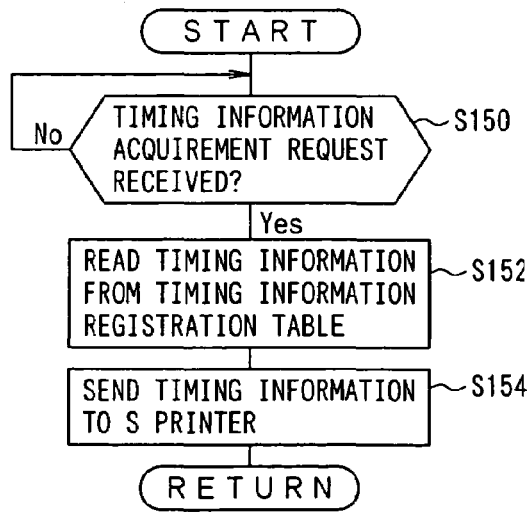

FIG. 6

START
- TIMING INFORMATION ACQUIREMENT REQUEST RECEIVED? — S150 (No: loop back)
- Yes: READ TIMING INFORMATION FROM TIMING INFORMATION REGISTRATION TABLE — S152
- SEND TIMING INFORMATION TO S PRINTER — S154

RETURN

FIG. 11

500 PRINTER BASIC INFORMATION

| | | | | | |
|---|---|---|---|---|---|
| 502 — CLIENT/SERVER MODE | CLIENT | | | | |
| 504 — SERVER PRINTER ADDRESS | xxx.xxx.xxx.1 | | | | |
| 506 — PRINTER MANAGEMENT SERVER ADDRESS | yyy.yyy.yyy.yyy | | | | |
| 508 — NOTIFICATION DATE AND TIME | 2002/11/25  12:59:50 | | | | |
| 510 — SUB-NETWORK IDENTIFIER | xyzBranch | | | | |
| 512 — PRINTER OPERATION STATE LIST | USE (514) | IP ADDRESS (516) | PRINTER NAME (518) | STATE (520) |
| | MONOCHROME | xxx.xxx.xxx.1 | LP-9600 | Sleep |
| | COLOR | xxx.xxx.xxx.3 | LP-8300C | Ready |
| | | xxx.xxx.xxx.24 | LP-8000C | Sleep |

FIG. 12

530 PRINTER INFORMATION TABLE

| IP ADDRESS (532) | PRINTER NAME (534) |
|---|---|
| xxx.xxx.xxx.1 | LP-9600 |
| xxx.xxx.xxx.3 | LP-8300C |
| xxx.xxx.xxx.24 | LP-8000C |

FIG. 13

540 PERFORMANCE INFORMATION

| COMMUNICATION SPEED (542) | OWNED MEMORY (544) | HDD CAPACITY (546) |
|---|---|---|
| 100BASE | 192MB | 3GB |

550 TIMING INFORMATION REGISTRATION TABLE

| IP ADDRESS | PRINTER NAME | NOTIFICATION DATE AND TIME |
|---|---|---|
| xxx.xxx.xxx.1 | LP-9600 | 2002/11/25 12:59:50 |
| xxx.xxx.xxx.3 | LP-8300C | 2002/11/25 12:59:53 |
| xxx.xxx.xxx.24 | LP-8000C | 2002/11/25 12:59:56 |

560 STATUS INFORMATION REGISTRATION TABLE

| ObjectID | CONTENTS | VALUES |
|---|---|---|
| 1.3.6.1.2.1.x.y.z.1 | RESIDUE OF CYAN TONER | 100% |
| 1.3.6.1.2.1.x.y.z.2 | RESIDUE OF MAGENTA TONER | 55% |
| 1.3.6.1.2.1.x.y.z.3 | RESIDUE OF YELLOW TONER | 23% |
| : | : | : |

ACCESS CONTROL SYSTEM, ACCESSED TERMINAL, ACCESS TERMINAL AND PROGRAM FOR TERMINAL, AND ACCESS CONTROL METHOD

BACKGROUND OF THE INVENTION

1. Field of the Invention

The present invention relates to a system, a device and a program, and a method for controlling access to a plurality of network printers, and particularly relates to an access control system, an accessed terminal, an access terminal and a program for terminal, and an access control method suitable for inhibiting an increase in communication traffic and preventing an excessive process load applied to certain terminals and certain devices.

2. Description of the Related Art

Hitherto, for example, a printer management system shown in FIG. 40 has been used as a technique for collecting status information from a plurality of network printers by a printer management server.

FIG. 40 is a block diagram showing a configuration of a conventional printer management system.

As shown in FIG. 40, a printer management server 100 managing network printers 200 and a plurality of routers 110 are connected to the Internet 199. A plurality of network printers 200 and the printer management server 120 managing those network printers 200 are connected to each router 110, and the network printers 200 and the printer management server 120 are connected to the Internet 199 via the router 110. In addition, the router 110, the network printers 200 and the printer management server 120 constitute one sub-network 198. The sub-network 198 is established for each company, for example.

The network printer 200 is managed by the printer management server 120 of the sub-network 198 to which the network printer 200 itself belongs. Status information is periodically generated, and the generated status information is stored in a storage device. In addition, when a status information acquisition request is received, status information in the storage device is sent to the printer management server 120.

The printer management server 120 manages network printers 200 of the sub-network 198 to which the printer management server 120 itself belongs. The status information acquisition request is sent to each network printer 200 at predetermined intervals and when status information is received, the received status information is stored in a status information registration database (hereinafter, database is abbreviated simply as DB) for each network printer 200. In addition, status information in the status information registration DB is sent to a printer management server 100 at predetermined intervals.

The printer management server 100 manages printer management servers 120. When status information is received, the received status information is stored in a storage device for each network printer 200.

Furthermore, other techniques related to such a printer management system include, for example, a method for maintenance of printing device disclosed in Japanese Patent Laid-Open No. 8-161134 (hereinafter referred to as first exemplary conventional technique).

In addition, techniques for dynamically changing a server include, for example, a network system disclosed in Japanese Patent Laid-Open No. 2000-181653 (hereinafter referred to as second exemplary conventional technique).

In the second exemplary conventional technique, a first server designates an alternative server as a second server based on alternative server selection conditions in a device information table. Management information (device information table, performance information table) stored in the first server, an accumulated reference D2 (print request) and print data D1 are sent to a second server to make a replacement request the second server. The second server updates management information of the second server based on management information sent from the first server. In addition, the reference D2 sent from the first server, and print data D1 are stored in a spool. Then, the second server notifies a workstation that the server to which the print data D1 and reference D2 are sent has been changed to the second server, and notifies printers that the server acquiring print data D1 has been changed to the second server.

Consequently, the alternative server can be dynamically selected to continuously carry out print processing even if a failure occurs in the server.

However, the conventional printer management system described above has a problem such that because printer management servers 120 send status information in a status information registration DB to a printer management server 100 at predetermined intervals, access by a plurality of printer management servers 120 may be focused on the printer management server 100 to cause an increase in communication traffic and apply an excessive process load to the printer management server 100.

In addition, the conventional printer management system described above has a problem such that because the printer management server 120 is provided for each sub-network 198, costs and time and efforts are required for introduction and maintenance of the printer management server 120. The first and second exemplary conventional techniques have the same problem in the sense that servers should be provided.

Furthermore, the second exemplary conventional technique has a problem such that a certain server selects an alternative server, and therefore in case where a failure occurs in the certain server before replacement of the server, or a failure occurs in the certain server and the alternative server after replacement of the server, print processing may stop, and thus reliability against failures is insufficient.

Furthermore, the problem is not limited to the network printer, but can be anticipated for network devices other than the network printer.

The present invention has been made in consideration of such unsolved problems of conventional techniques, and has as its fist object the provision of an access control system, an accessed terminal, an access terminal and a program for terminal, and an access control method suitable for inhibiting an increase in communication traffic and preventing an excessive load applied to certain terminals and certain devices. In addition, the present invention has as its second object the provision of an access control system, an accessed terminal, an access terminal and a program for terminal, and an access control method suitable for reducing costs and time and efforts and improving reliability.

SUMMARY OF THE INVENTION

For achieving the above problems, an access control system of aspect 1 is a system in which a plurality of access terminals are connected to an accessed terminal accessed by the access terminals so that communications can be carried out, and access by the access terminals is controlled, wherein the accessed terminal comprises an access timing table defining access timing for each access terminal so that access by the access terminals is dispersed, and timing information notifying section for notifying the access terminal of timing information indicating access timing corresponding to the access terminal with reference to the access timing table, and the access terminal comprises timing information receiving section for receiving the timing information, and access section for making access to the accessed terminal based on the timing information received by the timing information receiving section.

According to this configuration, in the accessed terminal, reference is made to the access timing table to notify the access terminal of timing information indicating access timing corresponding to the access terminal by timing information notifying section.

In the access terminal, timing information is received by the timing information receiving section. When access is made to the accessed terminal, the accessed terminal is accessed by access section based the received timing information.

In the access timing table, access timing is defined for each access terminal so that access by access terminals is dispersed, and therefore if each access terminal makes access to the accessed terminal based on timing information, access by a plurality of access terminals is dispersed.

In this way, because access by a plurality of access terminals is hard to be focused on the accessed terminal, an increase in communication traffic can be inhibited, and the possibility that an excessive process load is applied to the accessed terminal can be reduced, compared to the conventional technique.

Here, forms in which access terminals are connected so that communications can be carried out include indirect connection between the accessed terminal and the access terminals through other communication terminals, communication devices and other communication equipment, in addition to direct connection between the accessed terminal and the access terminals. In the following, the same holds true for the accessed terminal of aspect 10, the access terminal of aspect 11, the program for terminal of aspects 24 and 25, and the access control method of aspect 38.

In addition, the accessed terminal is communication equipment connected to one end of a communication channel for communication with the access terminal, and is not limited as long as it has at least a server function, and the accessed terminal may also be configured to have both a client function and a server function. In the following, the same holds true for the accessed terminal of aspect 10, the program for terminal of aspect 24, and the access control method of aspect 38.

Furthermore, an access control system of aspect 2 is a system in which a first network device group including a first representative network device and one or more dependent network devices, a second network device group including a second representative network device and one or more of the dependent network devices, and a device management terminal managing the network devices are connected so that communications can be carried out, the first and second representative network devices collect management information of a plurality of network devices including themselves in network device groups to which the representative network devices belong, and the management information collected by the first and second representative network devices is collected by the device management terminal, wherein the device management terminal comprises an access timing table defining access timing for each representative network device so that access from the first and second representative network devices to the device management terminal is dispersed, and timing information notifying section for notifying the representative network device of timing information indicating access timing corresponding to the representative network device with reference to the access timing table, the dependent network device comprises first management information storing section for storing management information of the network device itself, and first management information sending section for sending management information of the first management information storing section to the representative network device of the network device group to which the network device itself belongs, and the representative network device comprises second management information storing section for storing management information of the representative network devices and the dependent network devices, management information receiving section for receiving the management information, management information registering section for registering in the second management information storing section the management information received by the management information receiving section, timing information receiving section for receiving the timing information, and second management information sending section for sending management information of the second management information storing section to the device management terminal based on the timing information received by the timing information receiving section.

According to this configuration, in the dependent network device, management information of first management information storing section is sent to the representative network device of the network device group to which the network device itself belongs by first management information sending section, in each network device group.

In the representative network device, when management information is received by management information receiving section, the received management information is registered in second management information storing section by management information registering section.

On the other hand, in the device management terminal, reference is made to the access timing table to notify the representative network device of timing information indicating access timing corresponding to the representative network device by timing information notifying section.

In the representative network device, timing information is received by timing information receiving section. When access is made to the device management terminal, management information of second management information storing section is sent to the device management terminal based on the received timing information by second management information sending section.

In the access timing table, access timing is defined for each representative network device so that access from the first and second representative network devices to the device management terminal is dispersed, and therefore if each representative network device makes access to the device management terminal based on the timing information, access by first and second representative network devices is dispersed.

In this way, because access by first and second representative network devices is hard to be focused on the device management terminal, an increase in communication traffic can be inhibited, and the possibility that an excessive process load is applied to the device management terminal can be reduced, compared to the conventional technique.

In addition, because it is not necessary to provide the device management terminal for each sub-network device, costs and time and effort required for introduction and maintenance of the system can be reduced compared to the conventional technique.

Furthermore, because the representative network device sends management information of each network device to the device management terminal collectively, a process load on the device management terminal can be reduced.

Here, the management information is information for managing the network device, and the information includes, for example, device information about the network device, and status information about the status of the network device. In the following, the same holds true for the access control system of aspect 4, network device of aspects 14, 16 and 19, program for device of aspects 28, 30 and 33, and the access control method of the aspect 39.

In addition, forms in which the network device is connected so that communications can be carried out include indirect connection between the device management terminal and the network device through other communication terminals, communication devices and other communication equipment, in addition to direct connection between the device management terminal and the network device. In the following, the same holds true for the access control system of aspect 4, the device management terminal of aspect 12, network device of aspects 14, 16 and 19, the program for terminal of aspect 26, program for device of aspects 28, 30 and 33, and the access control method of aspect 39.

In addition, the dependent network device may belong to the first network device group and the second network device group, or further a plurality of network device groups in an overlapping manner but more preferably, it belongs to any one of network device groups. In the following, the same holds true the device management terminal of aspect 12, the program for terminal of aspect 26, and the access control method of aspect 39.

In addition, the first management information storing section stores management information with any means and at any time, and may store management information in advance, or may store management information with an external input or the like during operation of this system without storing management information in advance. The same holds true for the case where management information is stored in second management information storing section. In the following, the same holds true for the access control system of aspect 4, and network device of aspects 14, 16 and 19.

In addition, the device management terminal may be realized as a single terminal, or may be realized as a network system with a plurality of terminals connected so that communications can be carried out. In the latter case, each component may belong to any of a plurality of terminals as long as it is connected so that communications may be made. For example, if two terminals are connected so that communications can be carried out to form a device management terminal, a configuration can be considered such that the first device management terminal is provided with an access timing table, and the second device management terminal is provided with timing information notifying section. In the following, the same holds true for the access control system of aspect 4, the device management terminal of aspect 12, the program for terminal of aspect 26, and the access control method of aspect 39.

In addition, the device management terminal is communication equipment connected to one end of a communication channel for communication with the network device, and is not limited as long as it has at least a server function, and the device management terminal may also be configured to have both a client function and a server function. In the following, the same holds true for the access control system of aspect 4, the device management terminal of aspect 12, the program for terminal of aspect 26, and the access control method of aspect 39.

Furthermore, an access control system of aspect 3 is the access control system of aspect 2, wherein the first and second representative network devices each comprise a second access timing table defining access timing for each of dependent network devices so that access by the dependent network devices of the network device group to which the network device itself belongs is dispersed, and second timing information notifying section for notifying the dependent network device of timing information indicating access timing corresponding to the dependent network device with reference to the second access timing table, the dependent network device further comprises second timing information receiving section for receiving the timing information, and the first management information sending section for sending management information of the first management information storing section to the representative network device of the network device group to which the network device itself belongs based on the timing information received by the second timing information receiving section.

According to this configuration, in the representative network device, reference is made to the second access timing table to notify the dependent network device of timing information indicating access timing corresponding to the dependent network device by second timing information notifying section.

In the dependent network device, timing information is received by second timing information receiving section. When access is made to the representative network device, management information of first management information storing section is sent to the representative network device of the network device group to which the network device itself belongs by first management information sending section, based on the received timing information.

In the second access timing table, access timing is defined for each dependent network device so that access by the dependent network device of the network device group to which the network device itself belongs is dispersed, and therefore if each dependent network device makes access to the representative network device based on timing information, access by a plurality of dependent network devices is dispersed.

In this way, access by a plurality of dependent network devices is hard to be focused on the representative, an increase in communication traffic can be inhibited, and the possibility that an excessive process load is applied to the representative network device can be reduced.

Furthermore, an access control system of aspect 4 is a system in which a first network device group consisting of a plurality of network devices, a second network device group consisting the plurality of network devices, and a device management terminal managing the network devices are connected so that communications can be carried out, any of network devices belonging to the network device group serves as a representative network device to collect management information of a plurality of network devices including itself, which belong to the network device group, and the management information collected by each representative network device is collected by the device management terminal, wherein the device management terminal comprises an access timing table defining access timing for each representative network device so that access from the representative network devices to the device management terminal is dispersed, and timing information notifying section for notifying the representative network device of timing information indicating access timing corresponding to the representative network device with reference to the access timing table, the network device comprises mode switching section for making a switch between a mode in which the network device is the representative network device and a mode in which the network device is a dependent network device other than the representative network device, of the network device group, first management information storing section for storing management information of the network device itself, second management information storing section for storing management information of the representative network device and the dependent network device, first management information sending section for sending management information of the first management information storing section to the representative network device of the network device group to which the network device itself belongs, management information receiving section for receiving the management information, management information registering section for registering in the second management information storing section the management information received by the management information receiving section, timing information receiving section for receiving the timing information, and second management information sending section for sending management information of the second management information storing section to the device management terminal based on the timing information received by the timing information receiving section, the operations of the management information receiving section, the management information registering section, the timing information receiving section and the second management information sending section are enabled when the network device itself is the representative network device, and the operation of the first management information sending section is enabled when the network device itself is the dependent network device.

According to this configuration, in each network device group, a switch is made to a mode in which the network device is the representative network device by mode switching section for any of a plurality of network devices. In addition, a switch is made to a mode in which the network device is the dependent network device by mode switching section for other network devices.

In the dependent network device, the operation of first management information sending section is enabled, and thus management information of first management information storing section is sent to the representative network device of the network device group to which the network device itself belongs, by first management information sending section.

In the representative network device, the operations management information receiving section and management information registering section are enabled, and thus when management information is received by management information receiving section, the received management information is registered in second management information storing section by management information registering section.

On the other hand, in the device management terminal, reference is made to the access timing table to notify the representative network device of timing information indicating access timing corresponding to the representative network device by timing information notifying section.

In the representative network device, the operations of timing information receiving section and second management information sending section are enabled, and thus timing information is received by timing information receiving section. When access is made to the device management terminal, management information of second management information storing section is sent to the device management terminal based on the received timing information by second management information sending section.

In the access timing table, access timing is defined for each representative network device so that access from the representative network device to the device management terminal is dispersed, and therefore if each representative network device makes access to the device management terminal based on timing information, access by a plurality of representative network devices is dispersed.

In this way, access by a plurality of representative network devices is hard to be focused on the device management terminal, an increase in communication traffic can be inhibited, and the possibility that an excessive process load is applied to the device management terminal can be reduced, compared to the conventional technique.

In addition, because it is not necessary to provide the device management terminal for each sub-network, costs and time and efforts required for introduction and maintenance of the system can be reduced, compared to the conventional technique. In addition, any of a plurality of network devices can play a role of a server, and therefore even if a failure occurs in a certain network device, service by the network device unlikely stops. Thus, reliability against failures can be improved, compared to the conventional technique.

Furthermore, an access control system of aspect 5 is the access control system of aspect 4, wherein the network device disables the operations of the management information registering section and the second management information sending section when the network device itself is the dependent network device.

According to this configuration, in the dependent network device, the operations of management information registering section and second management information sending section are disabled, and therefore registration by management information registering section and sending by second management information sending section are never performed.

In this way, because the representative network device sends management information of network devices to the device management terminal collectively, a process load on the device management terminal can be reduced, compared to the configuration in which network devices each send management information.

Furthermore, an access control system of aspect 6 is the access control system of any of aspects 4 and 5, wherein the network device group consists of at least three network devices, the network device further comprises a second access timing table defining access timing for each of dependent network devices so that access by the dependent network devices of the network device group to which the network device itself belongs is dispersed, second timing information notifying section for notifying the dependent network device of timing information indicating access timing corresponding to the dependent network device with reference to the second access timing table, and second timing information receiving section for receiving the timing information, the operation of the second timing information notifying section is enabled when the network device itself is the representative network device, the operation of the timing information receiving section is enables when the network device itself is the dependent network device, and the first management information sending section sends management information of the first management information storing section to the representative network device of the network device group to which the network device itself belongs, based on the timing information received by the second timing information receiving section.

According to this configuration, in the representative network device, the operation of second timing information notifying section is enabled, and therefore reference is made to the second access timing information table to notify the dependent network device of timing information indicating access timing corresponding to the dependent network device by second timing information notifying section.

In the dependent network device, the operations of second timing information receiving section and first management information sending section are enabled, and therefore timing information is received by second timing information receiving section. When access is made to the representative network device, management information of first management information storing section is sent to the representative network device of the network device group to which the network device itself belongs, based on the received timing information, by first management information sending section.

In the second access timing table, access timing is defined for each dependent network device so that access by the dependent network device of the network device group to which the network device itself belongs is dispersed, and therefore if each dependent network device makes access to the representative network device based on timing information, access by a plurality of dependent network devices is dispersed.

In this way, because access by a plurality of dependent network devices is hard to be focused on the representative network device, an increase in communication traffic can be inhibited, and the possibility that an excessive load is applied to the representative network device can be reduced.

Furthermore, an access control system of aspect 7 is the access control system of aspect 6, wherein the network device disables the operation of the second timing information notifying section when the network device itself is the dependent network device.

According to this configuration, in the dependent network device, the operation of second timing information notifying section is disabled, and therefore notification by second timing information notifying section is never performed.

In this way, because the representative network device sends timing information to the dependent network device, an increase in communication traffic can be inhibited, and the possibility that an excessive load is applied to the dependent network device can be reduced, compared to the configuration network devices each send timing information.

Furthermore, an access control system of aspect 8 is the access control system of any of aspects 3, 6 and 7, wherein the access timing table defines as the access timing a date or time when access is started for each representative network device so that access periods of the representative network devices do not overlap one another.

According to this configuration, in the representative network device, the sending of management information of second management information storing section is started at a date or time indicated by the received timing information by second management information sending section when access is made to the device management terminal. If each representative network device makes access to the device management terminal based on timing information, the possibility that access periods of representative network devices overlap one another is reduced.

In this way, because access by a plurality of representative network devices is effectively dispersed, and thus access is harder to be focused on the device management terminal, an increase in communication traffic can be further inhibited, and the possibility that an excessive process load is applied to the device management terminal can be further reduced.

Furthermore, an access control system of aspect 9 is the access control system of any of aspects 3 and 6 to 8, wherein the second access timing table defines as the access timing a date or time when access is started for each dependent network device so that access periods of the dependent network devices do not overlap one another.

According to this configuration, in the dependent network device, the sending of management information of first management information storing section is started at a date or time indicated by the received timing information by first management information sending section when access is made to the representative network device. If each dependent network device makes access to the representative network device based on timing information, the possibility that access periods of dependent network devices overlap one another is reduced.

In this way, because access by a plurality of dependent network devices is effectively dispersed, and thus access is harder to be focused on the representative network device, an increase in communication traffic can be further inhibited, and the possibility that an excessive process load is applied to the representative network device can be further reduced.

On the other hand, for achieving the above object, an accessed terminal of aspect 10 is a terminal connected to a plurality of access terminals so that communications can be carried out, comprising:

an access timing table defining access timing for each access terminal so that access by the access terminals is dispersed, and timing information notifying section for notifying the access terminal of timing information indicating access timing corresponding to the access terminal with reference to the access timing table.

According to this configuration, an action equivalent to that of the accessed terminal in the access control system of aspect 1 is obtained. Thus, an effect equivalent to that of the access control system of aspect 1 is obtained.

On the other hand, for achieving the above object, an access terminal of aspect 11 is a terminal connected to an accessed terminal so that communications can be carried out, comprising:

timing information receiving section for receiving timing information indicating access timing, and access section for making access to the accessed terminal based on the timing information received by the timing information receiving section.

According to this configuration, an action equivalent to that of the access terminal in the access control system of aspect 1 is obtained. Thus, an effect equivalent to that of the access control system of aspect 1 is obtained.

On the other hand, for achieving the above object, a device management terminal of aspect 12 is a terminal connected to a first network device group including a first representative network device and one or more dependent network devices and a second network device group including a second representative network device and one or more the dependent network devices so that communications can be carried out, comprising:

an access timing table defining access timing for each representative network device so that access from the first and second representative network devices to the device management terminal is dispersed, and timing information notifying section for notifying the representative network device of timing information indicating access timing corresponding to the representative network device with reference to the access timing table.

According to this configuration, an action equivalent to that of the device management terminal in the access control system of aspect 2 or 4 is obtained. Thus, an effect equivalent to that of the access control system of aspect 2 or 4 is obtained.

Furthermore, a device management terminal of aspect 13 is the device management terminal of aspect 12, wherein the access timing table defines as the access timing a date or time when access is started for each representative network device so that access periods of the representative network devices do not overlap one another.

According to this configuration, an action equivalent to that of the device management terminal in the access control system of aspect 8 is obtained. Thus, an effect equivalent to that of the access control system of aspect 8 is obtained.

On the other hand, for achieving the above object, a network device of aspect 14 is a device connected to a representative network device and a device management terminal so that communications can be carried out, comprising:

first management information storing section for storing management information of the network device itself, and first management information sending section for sending management information of the first management information storing section to the representative network device.

According to this configuration, an action equivalent to that of the dependent network device in the access control system of aspect 2 is obtained. Thus, an effect equivalent to that of the access control system of aspect 2 is obtained.

Furthermore, a network device of aspect 15 is the network device of aspect 14, further comprising:

second timing information receiving section for receiving timing information indicating access timing, the first management information sending section sends management information of the first management information storing section to the representative network device based on the timing information received by the second timing information receiving section.

According to this configuration, an action equivalent to that of the dependent network device in the access control system of aspect 3 is obtained. Thus, an effect equivalent to that of the access control system of aspect 3 is obtained.

Furthermore, a network device of aspect 16 is a device connected to one or more dependent network devices and a device management terminal so that communications can be carried out, comprising:

second management information storing section for storing management information of the representative network device and the dependent network devices, management information receiving section for receiving the management information, management information registering section for registering in the second management information storing section the management information received by the management information receiving section, timing information receiving section for receiving timing information indicating access timing, and second management information sending section for sending management information of the second management information storing section to the device management terminal based on the timing information received by the timing information receiving section.

According to this configuration, an action equivalent to that of the representative network device in the access control system of aspect 2 is obtained. Thus, an effect equivalent to that of the access control system of aspect 2 is obtained.

Furthermore, a network device of aspect 17 is the network device of aspect 16, further comprising:

a second access timing table defining access timing for each dependent network device so that access by the dependent network devices is dispersed, and second timing information notifying section for notifying the dependent network device of timing information indicating access timing corresponding to the dependent network device with reference to the second access timing table.

According to this configuration, an action equivalent to that of the representative network device in the access control system of aspect 3 is obtained. Thus, an effect equivalent to that of the access control system of aspect 3 is obtained.

Furthermore, a network device of aspect 18 is the network device of aspect 17, wherein the second access timing table defines as the access timing a date or time when access is started for each dependent network device so that access periods of the dependent network devices do not overlap one another.

According to this configuration, an action equivalent to that of the representative network device in the access control system of aspect 9 is obtained. Thus, an effect equivalent to that of the access control system of aspect 9 is obtained.

Furthermore, a network device of aspect 19 is a device connected to one or more network devices and a device management terminal so that communications can be carried out, comprising:

mode switching section for making a switch between a mode in which the network device is a representative network device and a mode in which the network device is a dependent network device, first management information storing section for storing management information of the network device itself, second management information storing section for storing management information of the representative network device and the dependent network device, first management information sending section for sending management information of the first management information storing section to the representative network device, management information receiving section for receiving the management information, management information registering section for registering in the second management information storing section the management information received by the management information receiving section, timing information receiving section for receiving timing information indicating access timing, and second management information sending section for sending management information of the second management information storing section to the device management terminal based on the timing information received by the timing information receiving section, wherein the operations of the management information receiving section, the management information registering section, the timing information receiving section and the second management information sending section are enabled when the network device itself is the representative network device, and the operation of the first management information sending section is enabled when the network device itself is the dependent network device.

According to this configuration, an action equivalent to that of the network device in the access control system of aspect 4 is obtained. Thus, an effect equivalent to that of the access control system of aspect 4 is obtained.

Furthermore, a network device of aspect 20 is the network device of aspect 19, wherein the operations of the management information registering section and the second management information sending section are disabled when the network device itself is the dependent network device.

According to this configuration, an action equivalent to that of the network device in the access control system of aspect 5 is obtained. Thus, an effect equivalent to that of the access control system of aspect 5 is obtained.

Furthermore, a network device of aspect 21 is the network device of any of aspects 19 and 20, further comprising:

a second access timing table defining access timing for each dependent network device so that access by the dependent network devices is dispersed, second timing information notifying section for notifying the dependent network device of timing information indicating access timing corresponding to the dependent network device with reference to the second access timing table, and second timing information receiving section for receiving the timing information, wherein the operation of the second timing information notifying section is enabled when the network device itself is the representative network device, the operation of the second timing information receiving section is enabled when the network device itself is the dependent network device, and the first management information sending section sends management information of the first management information storing section to the representative network device based on the timing information received by the second timing information receiving section.

According to this configuration, an action equivalent to that of the network device in the access control system of aspect 6 is obtained. Thus, an effect equivalent to that of the access control system of aspect 6 is obtained.

Furthermore, a network device of aspect 22 is the network device of aspect 21, wherein the operation of the second timing information notifying section is disabled when the network device itself is the dependent network device.

According to this configuration, an action equivalent to that of the network device in the access control system of aspect 7 is obtained. Thus, an effect equivalent to that of the access control system of aspect 7 is obtained.

Furthermore, a network device of aspect 23 is the network device of any of aspects 21 and 22, wherein the second access timing table defines as the access timing a date or time when access is started for each dependent network device so that access periods of the dependent network devices do not overlap one another.

According to this configuration, an action equivalent to that of the network device in the access control system of aspect 9 is obtained. Thus, an effect equivalent to that of the access control system of aspect 9 is obtained.

On the other hand, for achieving the above object, a program for terminal of aspect 24 is a program to be executed by a computer connected to a plurality of access terminals so that communications can be carried out, wherein the program makes the computer carry out processing that is realized as timing information notifying section for notifying the access terminal of timing information indicating access timing corresponding to the access terminal, with reference to an access timing table defining access timing for each access terminal so that access by the access terminals is dispersed.

According to this configuration, if the program is read by the computer, and the computer carries out processing in accordance with the read program, an action and an effect equivalent to those of the accessed terminal of aspect 10 are obtained.

Furthermore, a program for terminal of aspect 25 is a program to be executed by a computer connected to an accessed terminal so that communications can be carried out, wherein the program makes the computer carry out processing that is realized as timing information receiving section for receiving timing information indicating access timing, and access section for making access to the accessed terminal based on the timing information received by the timing information receiving section.

According to this configuration, if the program is read by the computer, and the computer carries out processing in accordance with the read program, an action and an effect equivalent to those of the access terminal of aspect 11 are obtained.

Furthermore, a program for terminal of aspect 26 is a program to be executed by a computer connected to a first network device group including a first representative network device and one or more dependent network devices, and a second network device group including a second representative network device and one or more of the dependent network devices so that communications can be carried out, wherein the program makes the computer carry out processing that is realized as timing information notifying section for notifying the representative network device of timing information indicating access timing corresponding to the representative network device, with reference to an access timing table defining access timing for each representative network device so that access from the first and second representative network devices to the computer is dispersed.

According to this configuration, if the program is read by the computer, and the computer carries out processing in accordance with the read program, an action and an effect equivalent to those of the device management terminal of aspect 12 are obtained.

Furthermore, a program for terminal of aspect 27 is the program for terminal of aspect 26, wherein the access timing table defines as the access timing a date or time when access is started for each representative network device so that access periods of the representative network devices do not overlap one another.

According to this configuration, if the program is read by the computer, and the computer carries out processing in accordance with the read program, an action and an effect equivalent to those of the device management terminal of aspect 13 are obtained.

On the other hand, for achieving the above object, a program for device of aspect 28 is a program to be executed by a computer connected to a representative network device and a device management terminal so that communications can be carried out, the program makes the computer carry out processing that is realized as first management information sending section for sending management information of first management information storing section storing management information of the network device itself to the representative network device.

According to this configuration, if the program is read by the computer, and the computer carries out processing in accordance with the read program, an action and an effect equivalent to those of the network device of aspect 14 are obtained.

Furthermore, a program for device of aspect 29 is the program for device of aspect 28, further comprising:

a program making the computer carry out processing that is realized as second timing information receiving section for receiving timing information indicating access timing, wherein the first management information sending section sends management information of the first management information storing section to the representative network device based on the timing information received by the second timing information receiving section.

According to this configuration, if the program is read by the computer, and the computer carries out processing in accordance with the read program, an action and an effect equivalent to those of the network device of aspect 15 are obtained.

Furthermore, a program for device of aspect 30 is a program to be executed by a computer connected to one or more dependent network devices and a device management terminal so that communications can be carried out, wherein the program makes the computer carry out processing that is realized as management information receiving section for receiving management information of the network device, management information registering section for registering in second management information storing section the management information received by the management information receiving section, timing information receiving section for receiving timing information indicating access timing, and second management information sending section for sending management information of the second management information storing section to the device management terminal based on the timing information received by the timing information receiving section.

According to this configuration, if the program is read by the computer, and the computer carries out processing in accordance with the read program, an action and an effect equivalent to those of the network device of aspect 16 are obtained.

Furthermore, a program for device of aspect 31 is the program for device of aspect 30, further comprising:

a program making the computer carry out processing that is realized as second timing information notifying section for notifying the dependent network device of timing information indicating access timing corresponding to the dependent network device, with reference to a second access timing table defining access timing for each dependent network device so that access by the dependent network devices is dispersed.

According to this configuration, if the program is read by the computer, and the computer carries out processing in accordance with the read program, an action and an effect equivalent to those of the network device of aspect 17 are obtained.

Furthermore, a program for device of aspect 32 is the program for device of aspect 31, wherein the second access timing table defines as the access timing a date or time when access is started for each dependent network device so that access periods of the dependent network devices do not overlap one another.

According to this configuration, if the program is read by the computer, and the computer carries out processing in accordance with the read program, an action and an effect equivalent to those of the network device of aspect 18 are obtained.

Furthermore, a program for device of aspect 33 is a program to be executed by a computer connected to one or more network devices and a device management terminal so that communications can be carried out, comprising:

a program making the computer carry out processing that is realized as mode switching section for making a switch between a mode in which the network device is a representative network device and a mode in which the network device is a dependent network device, first management information sending section for sending management information of first management information storing section storing management information of the network device itself to the representative network device, management information receiving section for receiving the management information, management information registering section for registering in second management information storing section the management information received by the management information receiving section, timing information receiving section for receiving timing information indicating access timing, and second management information sending section for sending management information of the second management information storing section to the device management terminal based on the timing information received by the timing information receiving section, wherein the operations of the management information receiving section, the management information registering section, the timing information receiving section and the second management information sending section are enabled, and the operation of the first management information sending section is enabled when the network device itself is the dependent network device.

According to this configuration, if the program is read by the computer, and the computer carries out processing in accordance with the read program, an action and an effect equivalent to those of the network device of aspect 19 are obtained.

Furthermore, a program for device of aspect 34 is the program for device of aspect 33, wherein the operations of the management information registering section and the second management information sending section are disabled when the network device itself is the dependent network device.

According to this configuration, if the program is read by the computer, and the computer carries out processing in accordance with the read program, an action and an effect equivalent to those of the network device of aspect 20 are obtained.

Furthermore, a program for device of aspect 35 is the program for device of any of aspects 33 and 34, further comprising:

A program making the computer carry out processing that is realized as second timing information notifying section for notifying the dependent network device of timing information indicating access timing corresponding to the dependent network device with reference to a second access timing table defining access timing for each dependent network device so that access by the dependent network devices is dispersed, wherein the operation of the second timing information notifying section is enabled when the network device itself is the representative network device, the operation of the second timing information receiving section is enabled when the network device itself is the dependent network device, and the first management information sending section sends management information of the first management information storing section to the representative network device based on the timing information received by the second timing information receiving section.

According to this configuration, if the program is read by the computer, and the computer carries out processing in accordance with the read program, an action and an effect equivalent to those of the network device of aspect 21 are obtained.

Furthermore, a program for device of aspect 36 is the program for device of aspect 35, wherein the operation of the second timing information notifying section is disabled when the network device itself is the dependent network device.

According to this configuration, if the program is read by the computer, and the computer carries out processing in accordance with the read program, an action and an effect equivalent to those of the network device of aspect 22 are obtained.

Furthermore, a program for device of aspect 37 is the program for device of any of aspects 35 and 36, wherein the second access timing table defines as the access timing a date or time when access is started for each dependent network device so that access periods of the dependent network devices do not overlap one another.

According to this configuration, if the program is read by the computer, and the computer carries out processing in accordance with the read program, an action and an effect equivalent to those of the network device of aspect 23 are obtained.

On the other hand, for achieving the above object, an access control method of aspect 38 is a method in which a plurality of access terminals and an accessed terminal accessed by the access terminals are connected so that communications can be carried out, and access by the access terminals is controlled, the method comprising:

a timing information notifying step of notifying the access terminal of timing information indicating access timing corresponding to the access terminal with reference to an access timing table defining access timing for each access terminal so that access by the access terminals is dispersed, for the accessed terminal; and a timing information receiving step of receiving the timing information, and an access step of making access to the accessed terminal based on the timing information received in the timing information receiving step, for the access terminal.

In this way, an effect equivalent to that of the access control system of aspect 1 is obtained.

Furthermore, an access control method of aspect 39 is a method in which a first network device group including a first representative network device and one or more dependent network devices, a second network device group including a second representative network device and one or more of the dependent network devices, and a device management terminal managing the network devices are connected so that communications can be carried out, the first and second representative network devices each collect management information of a plurality of network devices including itself in the network device group to which the representative network device belongs, and the management information collected by the first and second representative network devices is collected by the device management terminal, the method comprising:

a first management information sending step of sending management information of first management information storing section storing management information of the network device itself to the representative network device of the network device group to which the network device itself belongs, for the dependent network device;

a management information receiving step of receiving the management information, and a management information registering step of registering in second management information storing section the management information received in the management information receiving step, for the representative network device;

a timing information notifying step of notifying the representative network device of timing information indicating access timing corresponding to the representative network device with reference to each representative network device so that access from the first and second representative networks to the device management terminal is dispersed, for the device management terminal; and a timing information receiving step of receiving the timing information, and a second management information sending step of sending management information of the second management information storing section to the device management terminal based on the timing information received in the timing information receiving step, for the representative network device.

In this way, an effect equivalent to that of the access control system of aspect 2 is obtained.

Furthermore, an access control method of aspect 40 is the access control method of aspect 39, the method comprising:

a second timing information notifying step of notifying the dependent network device of timing information indicating access timing corresponding to the dependent network device with reference to a second access timing table defining access timing for each dependent network device so that access by dependent network devices of the network device group to which the network device itself belongs is dispersed, for the representative network device; and a second timing information receiving step of receiving the timing information, for the dependent network device, wherein in the first management information sending step, management information of the first management information is sent to the representative network device of the network device group to which the network itself belongs, based on the timing information received in the second timing information receiving step.

In this way, an effect equivalent to that of the access control system of aspect 3 is obtained.

Furthermore, an access control method of aspect 41 is the access control method of aspect 40, wherein the access timing table defines as the access timing a date or time when access is started for each representative network device so that access periods of the representative network devices do not overlap one another.

In this way, an effect equivalent to that of the access control system of aspect 8 is obtained.

Furthermore, an access control method of aspect 42 is the access control method of any of aspects 40 and 41, wherein the second access timing table defines as the access timing a date or time when access is started for each independent network device so that access periods of the independent network devices do not overlap one another.

In this way, an effect equivalent to that of the access control system of aspect 9 is obtained.

Furthermore, an access control method of aspect 43 is the access control method of any of aspects 39 to 42, the method comprising:

a mode switching step of making a switch between a mode in which the network device is the representative network device and a mode in which the network device is the dependent network device.

In this way, an effect equivalent to that of the access control system of aspect 4 is obtained.

BRIEF DESCRIPTION OF THE DRAWINGS

FIG. 1 shows a configuration of a network system to which the present invention is applied;

FIG. 2 is a block diagram showing the configuration of a printer management server 100;

FIG. 3 shows a data structure of a printer information registration table 400;

FIG. 4 shows a data structure of a timing information registration table 410;

FIG. 5 is a flowchart showing main processing of the printer management server 100;

FIG. 6 is a flowchart showing timing information notification processing at step S100;

FIG. 11 shows a data structure of printer basic information 500;

FIG. 12 shows a data structure of a printer information registration table 530;

FIG. 13 shows a data structure of performance information 540;

DETAILED DESCRIPTION OF THE PREFERRED EMBODIMENTS

Figure 7:
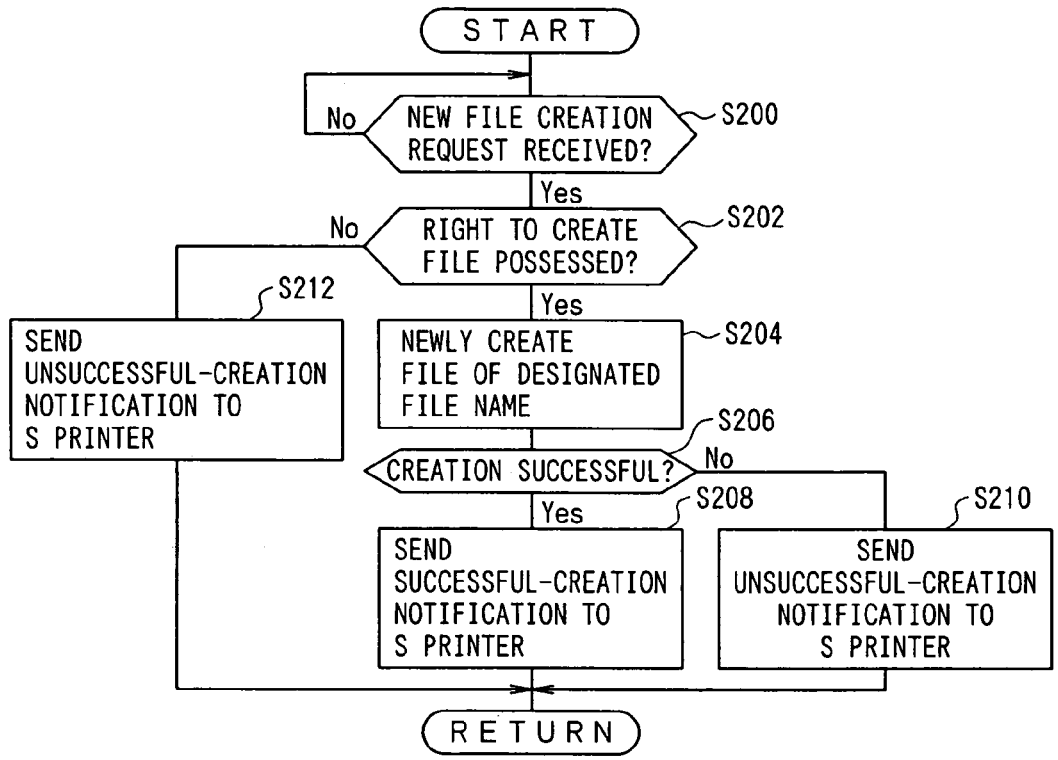
FIG. 7 is a flowchart showing file creation processing at step S102.

Embodiments of the present invention will be described below with reference to the drawings. FIGS. 1 to 39 show the embodiments of an access control system, an accessed terminal, an access terminal and a program for terminal, and an access control method according to the present invention.

In these embodiments, the access control system, the accessed terminal, the access terminal and the program for terminal, and the access control method according to the present invention are applied for the case where status information is collected from a plurality of network printers 200 as shown in FIG. 1.

First, the configuration of a network system to which the present invention is applied will be described with reference to FIG. 1.

FIG. 1 is a block diagram showing the configuration of the network system to which the present invention is applied.

As shown in FIG. 1, a printer management server 100 managing network printers 200, and a plurality of routers 110 are connected to the Internet 199. A plurality of network printers 200 are connected to each router 110, and network printers 200 are connected to the Internet 199 via routers 110. In addition, the router 110 and network printers 200 constitute one sub-network 198. The sub-network 198 is established for each company, for example. In addition, although not shown in the figure, a large number of user terminals are connected to each sub-network 198.

For the network printer 200, any one of network printers 200 belonging to the same sub-network 198 dynamically becomes a server printer 200 (hereinafter abbreviated as S printer in the drawings), while others become client printers 200 (hereinafter abbreviated as C printers in the drawings), and the server printer 200 collects status information of client printers 200 on their behalf. Status information includes, for example, remaining amount information associated with remaining amounts of toner and ink, printed paper count information associated with the number of papers used for printing, or trouble information associated with troubles such as failures.

The client printer 200 periodically generates status information of the network printer 200 itself, and stores the generated status information in a storage device. When a predetermined notification date and time comes, status information in the storage device is sent to the server printer 200.

The server printer 200 periodically generates status information of the network printer 200 itself, and stores the generated status information in the storage device. When status information is received, the received status information us stored in the storage device for each client printer 200, and when a predetermined notification date and time comes, status information in the storage device is sent to the printer management server 100.

The printer management server 100 manages server printers 200. When status information is received, the received status information is stored in the storage device for each server printer 200.

The user terminal has functions same as those of a general computer having a CPU, a ROM, a RAM, an I/F and the like bus-connected, and gives print instructions and print data to any of network printers 200 so that printing can be performed with the network printer 200.

The configuration of the printer management server 100 will now be described with reference to FIG. 2.

FIG. 2 is a block diagram showing the configuration of the printer management server 100.

As shown in FIG. 2, the printer management server 100 is comprised of a CPU 30 controlling operations and the entire system based on a control program, a ROM 32 having the control program of the CPU 30 and the like stored in predetermined areas in advance, a RAM 34 for storing data read from the ROM 32 and the like and results of calculation required in the process of operation, and an I/F 38 mediating input/output of data for external device, which are connected mutually and in a data-exchangeable manner through a bus 39 being a signal line for transferring data.

An input device 40 constituted by a keyboard, a mouse and the like capable of inputting data as a human interface, a storage device 42 for storing data, tables and the like as files, a display device 44 for displaying a screen based on a screen signal, and a signal line for establishing connections to the Internet 199 are connected to the I/F 38 as external devices.

A printer information registration table 400 having registered printer information for server printers 200, and a timing information registration table 410 having registered timing information indicating access timing of server printers 200 are stored in the storage device 42. Furthermore, although not shown in the figure, a status information registration table for collection for registering status information from each server printer 200 is stored in the storage device 42.

FIG. 3 shows a data structure of the printer information registration table 400.

The printer information registration table 400 is used for the printer management server 100 to communicate with each server printer 200 and in this table, one record is registered for each server printer 200 as shown in FIG. 3. Each record includes a field 402 having registered the IP address of the server printer 200 and a field 404 having registered the name of the server printer 200.

FIG. 4 shows a data structure of the timing information registration table 410.

The timing information registration table 410 defines as access timing a date and time when access to the printer management server 100 is started for each server printer 200 so that access periods of server printers 200 do not overlap one another and in this table, one record is registered for each server printer 200 as shown in FIG. 4. Each record includes a field 412 having registered the IP address of the server printer 200, a field 414 having registered the name of the server printer 200, and a field 416 having registered a date and time when the server printer 200 starts access.

On the other hand, referring to FIG. 2 again, the CPU 30 is constituted by a micro-processing unit MPU or the like, starts a predetermined program stored in a predetermined area of the ROM 32, and carries out main processing shown in the flowchart of FIG. 5 in accordance with the program.

First, main processing of the printer management server 100 will be described in detail with reference to FIG. 5.

FIG. 5 is a flowchart showing main processing of the printer management server 100.

When main processing is carried out in the CPU 30, processing first proceeds to step S100 as shown in FIG. 5.

At step S100, timing information notification processing for notifying the server printer 200 of timing information is carried out, processing proceeds to step S102, where file creation processing for creating a file in the storage device 42 according to a file creation request from the server printer 200 is carried out, and processing proceeds to step S104.

At step S104, property information provision processing for creating property information including a time of creation of a file, and providing the property information to the server printer 200 according to a property information acquirement request from the server printer 200 is carried out, processing proceeds to step S106, where status information registration processing for registering status information from the server printer 200 in the storage device 42 is carried out, a series of processing is ended, and a return is made to original processing.

Timing information notification processing at step S100 will now be described in detail with reference to FIG. 6.

FIG. 6 is a flow chart showing timing information notification processing at step S100.

Timing information notification processing is processing for notifying the server printer 200 of timing information, and when it is carried out step S100, processing first proceeds to step S150 as shown in FIG. 6.

At step S150, whether a timing information acquirement request for acquirement of timing information has been received or not is determined, and processing proceeds to step S152 if it is determined that the timing information acquirement request has been received (Yes), while processing is on standby at step S150 until the timing information acquirement request is received if it is determined that the timing information acquirement request has not been received (No).

At step S152, a date and time corresponding to the server printer 200 from which the request is made is read from the timing information registration table 410, processing proceeds to step S154, where timing information including the read date and time is sent to the server printer 200 from which the request is made, a series of processing is ended, and a return is made to original processing.

File creation processing at step S102 will now be described in detail with reference to FIG. 7.

FIG. 7 is a flow chart showing file creation processing at step S102.

File creation processing is processing for creating a file in the storage device 42 according to a file creation request from the server printer 200, and when it is carried out at step S102, processing first proceeds to step S200 as shown in FIG. 7.

At step S200, whether a file creation request for creation of a file has been received or not is determined, and processing proceeds to step S202 if it is determined that the file creation request has been received (Yes), while processing is on standby at step S200 until the file creation request is received if it is determined that the file creation request has not been received (No).

At step S202, whether or not the server printer 200 from which the request is made or a user thereof has a right to create a file is determined, and if it is determined that it has a right to create a file (Yes), processing proceeds to step S204, where a file of a file name designated by the file creation request is newly created in the storage device 42, and processing proceeds to step S206.

At step S206, whether the creation of the file is successful or not is determined, and if it is determined that the creation of the file is successful (Yes), processing proceeds to step S208, where a successful-creation notification indicating that the creation of the file is successful is sent to the server printer 200 from which the request is made, a series of processing is ended, and a return is made to original processing.

On the other hand, if it is determined that the creation of the file is unsuccessful (No) at step S206, processing proceeds to step S210, where an unsuccessful-creation notification indicating that the creation of the file is unsuccessful is sent to the server printer 200 from which the request is made, a series of processing is ended, and a return is made to original processing.

On the other hand, if it is determined that the server printer 200 from which the request is made or a user thereof has no right to cerate a file (No) at step S202, processing proceeds to step S212, where an unsuccessful-creation notification is sent to the server printer 200 from which the request is made, a series of processing is ended, and a return is made to original processing.

Property information provision processing at step S104 will now be described in detail with reference to FIG. 8.

Figure 8:
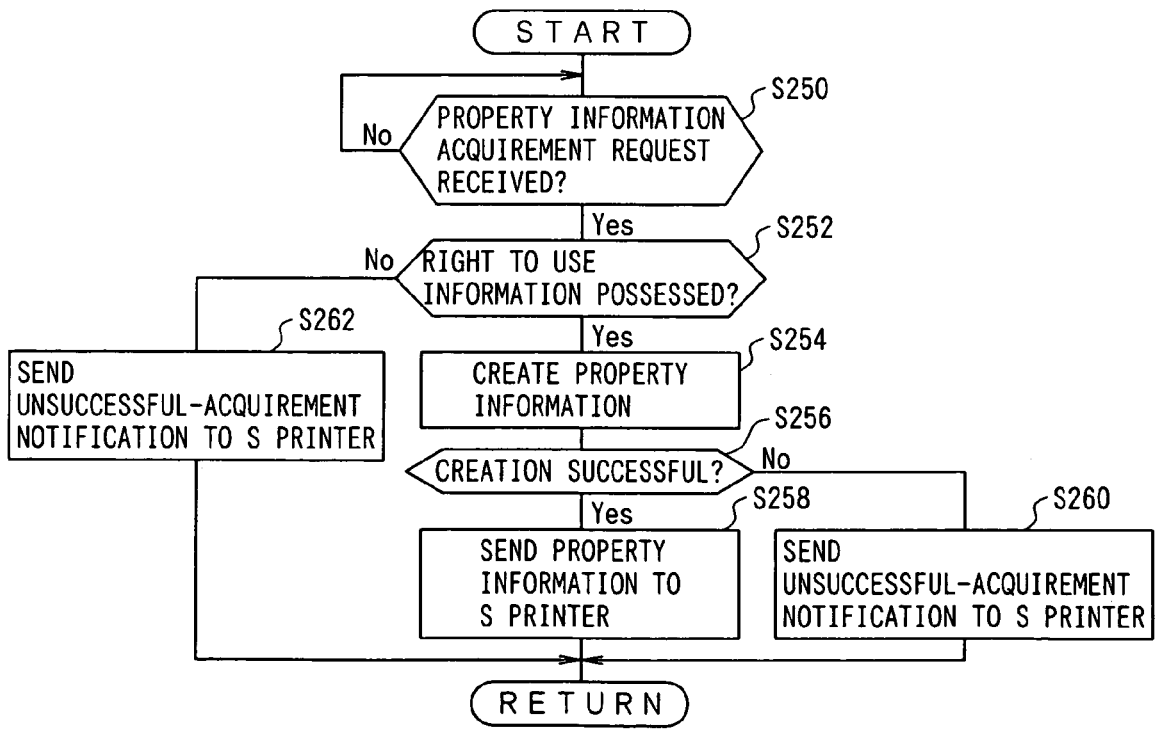
FIG. 8 is a flowchart showing property information provision processing at step S104.

FIG. 8 is a flowchart showing property information provision processing at step S104.

Property information provision processing is processing for generating property information including a time of creation of a file and providing the property information to the server printer 200 according to a property information acquirement request from the server printer 200, and when it is carried out at step S104, processing first proceeds to step S250 as shown in FIG. 8.

At step S250, whether a property information acquirement request for acquirement of property information has been received or not is determined, and processing proceeds to step S252 if it is determined that the property information acquirement request has been received (Yes), while processing is on standby at step S250 until the property information acquirement request is received if the property information acquirement request has not been received (No).

At step S252, whether or not the server printer 200 from which the request is made or a user thereof has a right to acquire property information is determined, and if it is determined that it has a right to acquire property information (Yes), processing proceeds to step S254, where property information is created for a file of a file name designated by the property information acquirement request, of files in the storage device 42, and processing proceeds to step S256.

At step S256, whether the creation of property information is successful or not is determined, and if it is determined that the creation of property information is successful (Yes), processing proceeds to step S258, where created property information is sent to the server printer 200 from which the request is made, a series of processing is ended, and a return is made to original processing.

On the other hand, if it is determined that the creation of property information is unsuccessful (No) at step S256, processing proceeds to step S260, where a unsuccessful acquirement notification indicating that the creation of property information is unsuccessful is sent to the server printer 200 from which the request is made, a series of processing is ended, and a return is made to original processing.

On the other hand, if it is determined that the server printer 200 from which the request is made or a user thereof has no right to acquire property information (No) at step S252, processing proceeds to step S262, where an unsuccessful acquirement notification is sent to the server printer 200 from which the request is made, a series of processing is ended, and a return is made to original processing.

Status information registration processing at step S106 will now be described with reference to FIG. 9.

Figure 9:
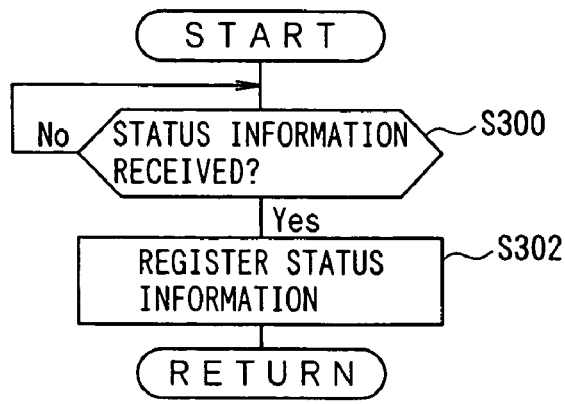
FIG. 9 is a flowchart showing status information registration processing at step S106.

FIG. 9 is a flowchart showing status information registration processing at step S106.

Status information registration processing is processing for registering status information from the server printer 200 in the storage device 42, and when it is carried out at step S106, processing first proceeds to step S300 as shown in FIG. 9.

At step S300, whether status information has been received or not is determined, and processing proceeds to step S302 if it is determined that status information has been received (Yes), while processing is on standby at step S300 until status information is received if it is determined that status information has not been received (No).

At step S302, received status information is registered in the status information registration table for collection for each network printer 200, a series of processing is ended, and a return is made to original processing.

The configuration of the network printer 200 will now be described with reference to FIG. 10. Furthermore, network printers 200 have same functions.

Figure 10:
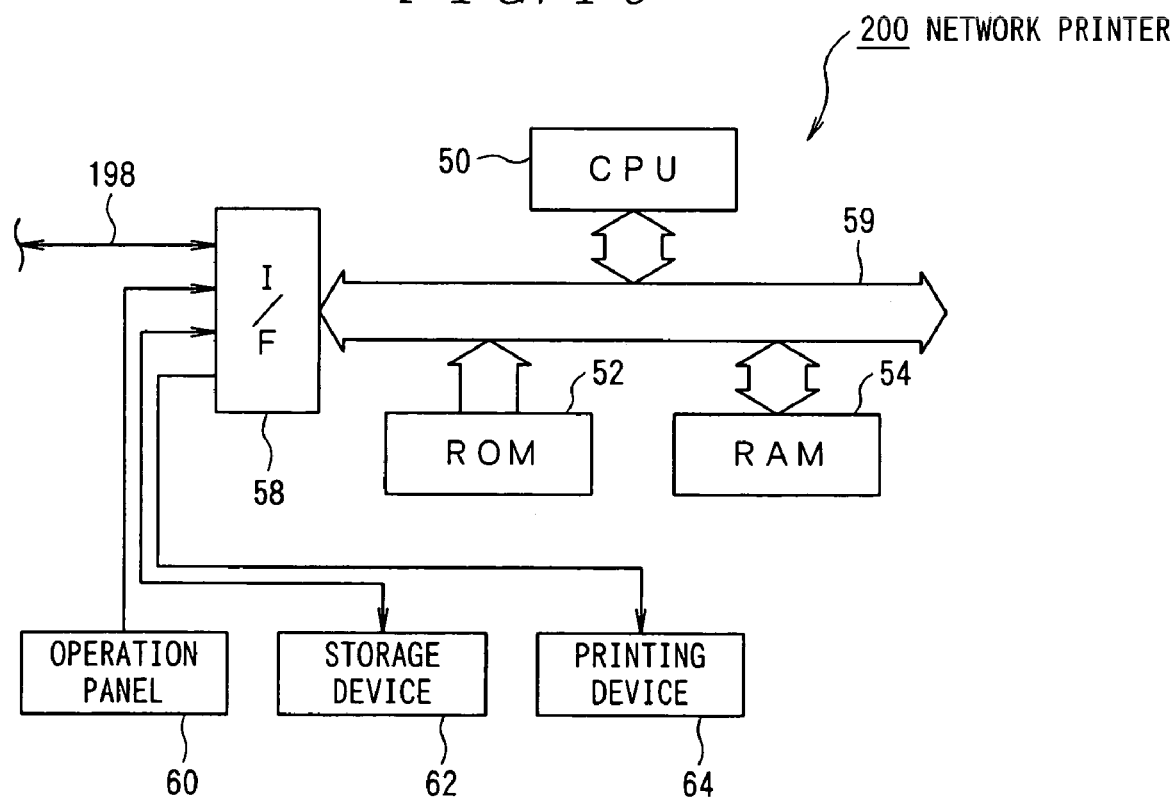
FIG. 10 is a block diagram showing a configuration of a network printer 200.

FIG. 10 is a block diagram showing the configuration of the network printer 200.

As shown in FIG. 10, the network printer 200 is comprised of a CPU 50 controlling operations and the entire system based on a control program, a ROM 52 having the control program of the CPU 50 and the like stored in predetermined areas in advance, a RAM 54 for storing data read from the ROM 52 and the like and results of calculation required in the process of operation, and an I/F 58 mediating input/output of data for external device, which are connected mutually and in a data-exchangeable manner through a bus 59 being a signal line for transferring data. Furthermore, the network printer 200 is not provided with an internal clock as is installed in a usual PC.

In addition, the network printer 200 can switch the operation state between a warm-up completion state in which printing can be performed immediately after reception of a print instruction, and a sleep state having smaller power consumptions than the warm-up state but requiring a predetermined amount of time between the instant when a print instruction is received and the instant when printing can be performed.

An operation panel 60 capable of inputting/displaying data as a human interface, a storage device 62 storing data and tables as files, a printing device 64 performing printing based on print data, and a signal line for establishing connection to a sub-network 198 are connected to the I/F 58 as external devices.

The storage device 62 has stored printer basic information 500 that is basic information of the network printer 200 itself, a printer information registration table 530 having registered printer information about other network printers 200, performance information 540 indicating the performance of the network printer 200 itself, a timing information registration table 550 having registered timing information indicating access timing of the client printer 200, and a status information registration table 560 for registering status information of the network printer 200 itself. Furthermore, although not shown in the figure, a status information registration table for collection for registering status information from each client printer 200 is stored in the storage device 62 aside from the status information registration table 560.

FIG. 11 shows a data structure of printer basic information 500.

As shown in FIG. 11, printer basic information 500 includes a data area 502 having stored any one of a mode in which the network printer 200 is a server printer 200 and a mode in which the network printer 200 is a client printer 200, a data area 504 having stored the IP address of the server printer 200, a data area 506 having stored the IP address of the printer management server printer 100, a data area 508 having dates and time stored, a data area 510 having stored an identifier of the sub-network 198, and a data area 512 having a printer operation state list stored. Furthermore, printer basic information 500 includes a protocol number indicating a protocol required for communication with the printer management server 100, a port number of IP for use in communication with the printer management server 100, and certification information required for certification of a user ID, a passwords and the like, in addition to information shown in FIG. 11.

As shown in FIG. 11, the printer operation state list 512 has one record registered for each client printer 200. Each record includes a field 514 having registered applications when network printers 200 are grouped for each application, a field 516 having registered the IP address of the client printer 200, a field 518 having registered the name of the client printer 200, and a field 520 having registered the operation state of the client printer 200. In the example of FIG. 11, "monochrome" as application, "xxx.xxx.xxx.1" as the IP address, "LP-9600" as the printer name, and "Sleep" as the operation state are registered in a first-state record. This indicates that the application is monochromatic print, and the operation state is the sleep state for the client printer 200 specified by the printer name "LP-9600" and IP address "xxx.xxx.xxx.1".

FIG. 12 shows a data structure of the printer information registration table 530.

The printer information registration table 530 is used for the server printer 200 to perform communication with each client printer 200 and in this table, one record is registered for each client printer 200 as shown in FIG. 12. Each record includes a field 532 having registered the IP address of the client printer 200 and a field 534 having registered the name of the client printer 200.

FIG. 13 shows a data structure of performance information 540.

As shown in FIG. 13, performance information 540 includes a data area 542 having stored the communication speed of the network printer 200, a data area 544 having stored the memory capacity of the RAM 54, and a data area 546 having stored the memory capacity of the storage device 62.

Figures 14, 15, 16:
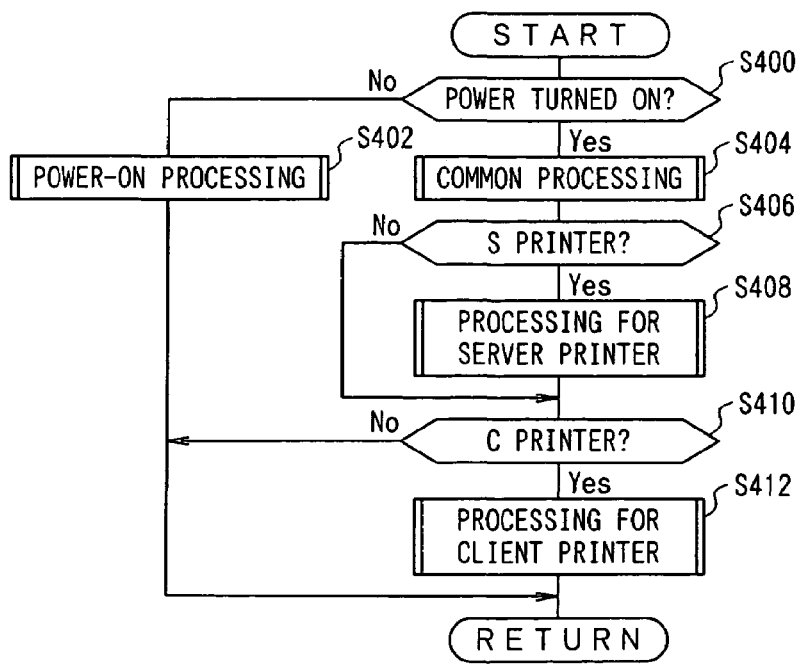
FIG. 14 shows a data structure of a timing information registration table 550.
FIG. 15 shows a data structure showing a status information registration table 560.
FIG. 16 is a flowchart showing main processing of the network printer 200.

FIG. 14 shows a data structure of the timing information registration table 550.

The timing information registration table 550 defines as access timing a notification date and time when access to the server printer 200 is started for each client printer 200 so that access periods of client printers 200 do not overlap one another, and in this table, one record is registered for each client printer 200 as shown in FIG. 14. Each record includes a field 552 having registered the IP address of the client printer 200, a field 554 having registered the name of the client printer 200, and a field 556 having registered the date and time when the client printer 200 starts access.

FIG. 15 shows a data structure of the status information registration table 560.

As shown in FIG. 15, one record is registered in the status information registration table 560 for each status item. Each record includes a field 562 for registering object IDs, a field 564 for registering the contents of status items, and a field 566 for registering values of status items.

On the other hand, referring to FIG. 10 again, the CPU 50 is constituted by a micro-processing unit MPU or the like, starts a predetermined program stored in a predetermined area of the ROM 52, and carries out main processing shown in the flowchart of FIG. 16 in accordance with the program.

First, main processing of the network printer 200 will be described in detail with reference to FIG. 16.

FIG. 16 is a flowchart showing main processing of the network printer 200.

When main processing is carried out in the CPU 50, processing first proceeds to step S400 as shown in FIG. 16.

At step S400, whether the power of the network printer 200 itself has been turned on or not is determined, and if it is determined that the power has not been turned on (Yes), processing proceeds to step S402, where power-on processing for turning the power of the network printer 200 itself according to a power-on instruction is carried out, a series of processing is ended, and a return is made to original processing.

On the other hand, at step S400, if it is determined that the power of the network printer 200 itself has been turned on (Yes), processing proceeds to step S404, where common processing to be performed in common in the server printer 200 and the client printer 200 is carried out, and processing proceeds to step S406.

At step S406, whether the network printer 200 itself is the server printer 200 or not is determined, and if it is determined that it is the server printer 200 (Yes), processing proceeds to step S408, where processing for server printer to be performed exclusively by the server printer 200 is carried out, and processing proceeds to step S410.

At step S410, whether the network printer 200 itself is the client printer 200 or not is determined, and if it is determined that it is the client printer 200 (Yes), processing proceeds to step S412, where processing for client printer to be performed exclusively by the client printer 200 is carried out, a series of processing is ended, and a return is made to original processing.

On the other hand, if it is determined that the network printer 200 itself is not the client printer 200 (No) at step S410, a series of processing is ended, and a return is made to original processing.

On the other hand, if it is determined that the network printer 200 itself is not the server printer 200 (No) at step S406, processing proceeds to step S410.

Power-on processing at step S402 will now be described with reference to FIG. 17.

Figure 17:
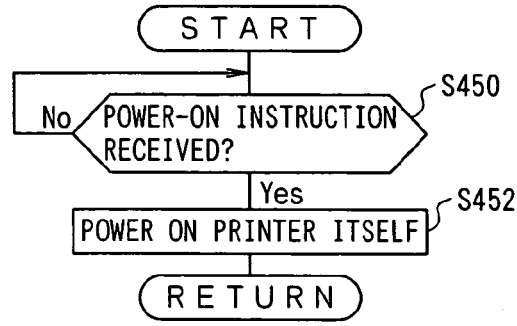
FIG. 17 is a flowchart showing power-on processing at step S402.

FIG. 17 is a flowchart showing power-on processing at step S402.

Power-on processing is processing for turning on the power of the network printer 200 itself, and when it is carried out at step S402, processing first proceeds to step S450 as shown in FIG. 17.

At step S450, whether a power-on instruction to turn the power on has been received or not, and processing proceeds to step S452 if it is determined that the power-on instruction has been received (Yes), while processing is on standby at step S450 until the power-on instruction is received if it is determined that the power-on instruction has not been received (No).

At step S452, the power of the network printer 200 itself is turned on, a series of processing is ended, and a return is made to original processing. Common processing at step S404 will now be described in detail with reference to FIG. 18.

Figure 18:
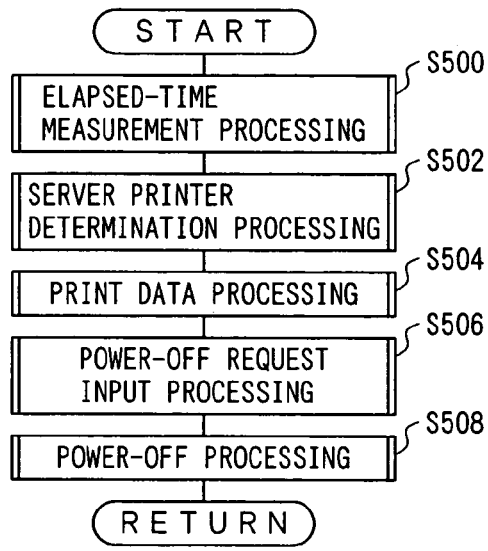
FIG. 18 is a flowchart showing common processing at step S404.

FIG. 18 is a flowchart showing common processing at step S404.

Common processing is processing to be performed in common in the server printer 200 and the client printer 200, and when it is carried out at step S404, processing first proceeds to step S500 as shown in FIG. 18.

At step S500, elapsed-time measurement processing for measuring time elapsing after start is carried out, processing proceeds to step S502, where server printer determination processing for determining the server printer 200 is carried out, processing proceeds to step S504, where print data processing for processing print data received from the user terminal or other network printers 200 is carried out, and processing proceeds to step S506.

At step S506, power-off request input processing for inputting a power-off request from a user is carried out, processing proceeds to step S508, where power-off processing for turning on the power of the network printer 200 itself is carried out according to a power-off instruction, a series of processing is ended, and a return is made to original processing.

Elapsed-time measurement processing at step S500 will now be described in detail with reference to FIG. 19.

Figure 19:
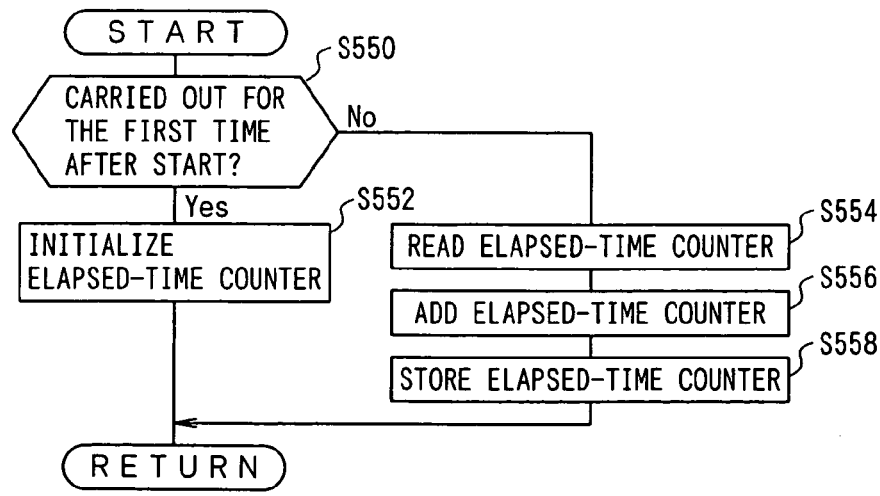
FIG. 19 is a flowchart showing elapsed-time measurement processing at step S500.

FIG. 19 is a flowchart showing elapsed-time measurement processing at step S500.

Elapsed-time measurement processing is processing for measuring time elapsing after start, and when it is carried out at step S500, processing first proceeds to step S550 as shown in FIG. 19.

At step S550, whether or not the processing is carried out for the first time after start, and if it is determined that the processing is carried out for the first time after start (Yes), processing proceeds to step S552, where an elapsed-time counter of the RAM 54 is initialized, a series of processing is ended, and a return is made to original processing.

On the other hand, if it is determined that the processing has been done one or more times after start (No) at step S550, processing proceeds to step S554, where the elapsed-time counter is read from the RAM 54, processing proceeds to step S556, where "1" is added to the read elapsed-time counter, processing proceeds to step S558, where the elapsed-time counter is stored in the RAM 54, a series of processing is ended, and a return is made to original processing.

Server printer determination processing at step S502 will now be described in detail with reference to FIG. 20.

Figure 20:
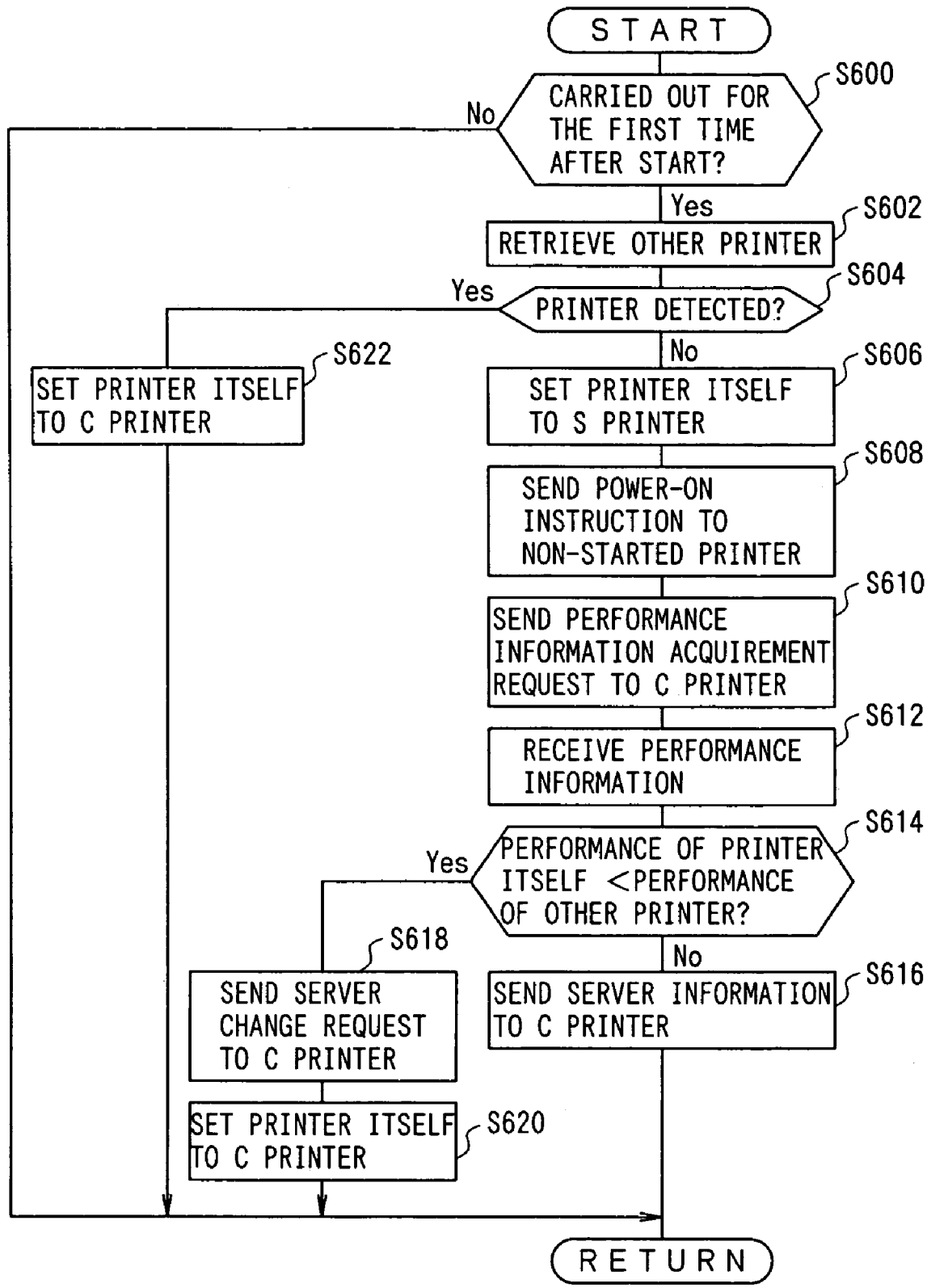
FIG. 20 is a flowchart showing server printer determination processing at step S502.

FIG. 20 is a flowchart showing server printer determination processing at step S502.

Server printer determination processing is processing for determining the server printer 200, and when it is carried out at step S502, processing first proceeds to step S600 as shown in FIG. 20.

At step S600, whether or not the processing is carried out for the first time after start or not is determined, and processing proceeds to step S602 if it is determined that the processing is carried out for the first time after start (Yes), a series of processing is ended, and a return is made to original processing if it is determined that the processing has been carried out one or more times after start (No).

At step S602, other network printers 200 are retrieved from the same sub-network 198, and processing proceeds to step S604, where whether or not other network printers 200 have been detected through the retrieval is determined, and if it is determined that no network printers 200 have been detected (No), processing proceeds to step S606.

At step S606, the network printer 200 itself is set to the server printer 200, processing proceeds to step S608, where power-on instructions are sent to network printers 200 that are not started, of client printers 200 belonging to the same sub-network 198, processing proceeds to step S610, where a performance information acquirement request for acquirement of performance information 540 is sent to each client printer 200, and processing proceeds to step S612.

At step S612, performance information 540 is received from each client printer 200, and processing proceeds to step S614, where whether or not the performance of the client printer 200 is higher than the performance of the network printer 200 itself is determined based on the received performance information 540 and performance information 540 in the storage device 62, and if it is determined that the performance of the network printer 200 itself is higher (No), processing proceeds to step S616, where server information including the IP address of the network printer 200 itself is sent to each client printer 200, a series of processing is ended, and a return is made to original processing.

On the other hand, if it is determined that the performance of the client printer 200 is higher than the performance of the network printer 200 itself (Yes) at step S614, processing proceeds to step S618, where a server change request for a change of the server printer 200 is sent to the client printer 200 having the highest performance, processing proceeds to step S620, where the network printer 200 itself is set to the client printer 200, a series of processing is ended, and a return is made to original processing.

On the other hand, if it is determined that other network printers 200 have been detected through retrieval (Yes) at step S604, processing proceeds to step S622, where the network printer 200 itself is set to the client printer 200, a series of processing is ended, and a return is made to original processing.

On the other hand, it is determined that the processing has been done one or more times after start (No) at step S600, a series of processing is ended, and a return is made to original processing.

Print data processing at step S504 will now be described in detail with reference to FIG. 21.

Figure 21:
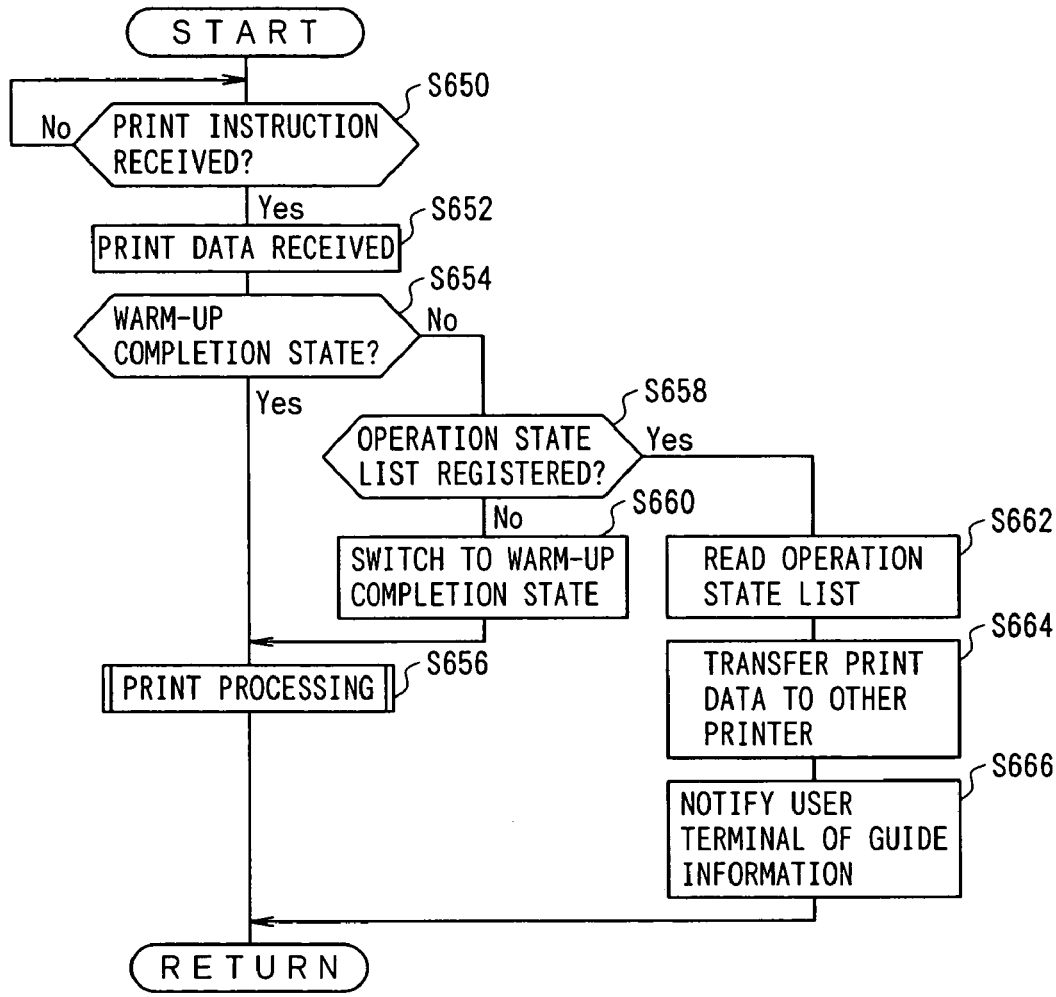
FIG. 21 is a flowchart showing print data processing at step S504.

FIG. 21 is a flowchart showing print data processing at step S504.

Print data processing is processing for processing print data received from the user terminal or other network printers 200, and when it is carried out at step S504, processing first proceeds to step S650 as shown in FIG. 21.

At step S650, whether a print instruction has been received or not is determined, and processing proceeds to step S652 if it is determined that the print instruction has been received (Yes), while processing is on standby at step S650 until the print instruction is received if it is determined that the print instruction has not been received.

At step S652, print data is received, and processing proceeds to step S654, where whether the operation state of the network printer 200 is a warm-up completion state or not is determined, and if it is determined that it is a warm-up completion state (Yes), processing proceeds to step S656, where printing is performed by the printing device 64 based on the received print data, a series of processing is ended, and a return is made to original processing.

On the other hand, if it is determined that the operation state of the network printer 200 itself is not a warm-up completion state (No) at step S654, processing proceeds to step S658, where whether or not the printer operation state list 512 is registered in the storage device 62 is determined, and if its is determined that the printer operation state list 512 is not registered (No), processing proceeds to step S660, where the operation state of the network printer 200 itself is switched to the warm-up completion state, and processing proceeds to step S656.

On the other hand, if it is determined that the printer operation state list 512 is registered in the storage device 62 (Yes) at step S658, processing proceeds to step S662, where the printer operation state list 512 is read from the storage device 62, and processing proceeds to step S664.

At step S664, print data is transferred to other network printers 200 in the warm-up completion state based on the read printer operation state list 512, processing proceeds to step S666, where guide information about the network printer to which print data is transferred is a user terminal from which the request is made, a series of processing is ended, and a return is made to original processing.

Power-off request input processing at step S506 will now be described in detail with reference to FIG. 22.

Figure 22:
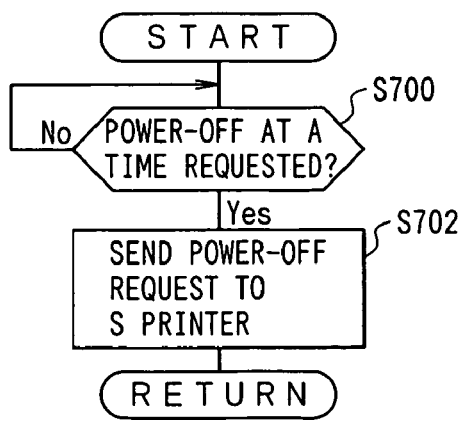
FIG. 22 is a flowchart showing power-off request input processing at step S506.

FIG. 22 is a flowchart showing power-off request input processing at step S506.

Power-off request input processing is processing for inputting a power-off request from a user, and when it is carried out at step S506, processing first proceeds to step S700 as shown in FIG. 22.

At step S700, whether or not a request for turning off the power of all the network printers 200 in the same subnetwork 198 at a time has been inputted from the operation panel 60 is determined, and processing proceeds to step S702 if it is determined that the power-off request has been inputted (Yes), while processing is on standby at step S700 until the power-off request is inputted if it is determined that the power-off request has not been inputted (No).

At step S702, the power-off request is sent to the server printer 200, a series of processing is ended, and a return is made to original processing.

Power-off processing at step S508 will now be described in detail with reference to FIG. 23.

Figure 23:
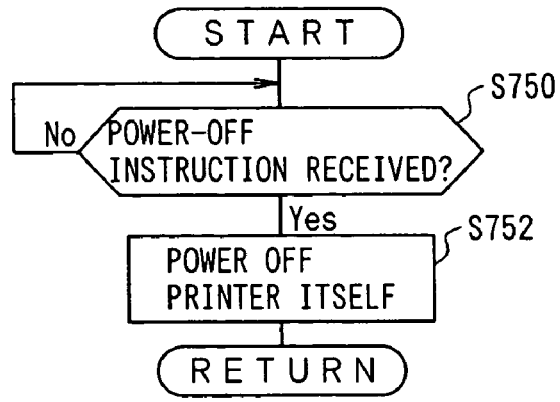
FIG. 23 is a flowchart showing power-off processing at step S508.

FIG. 23 is a flowchart showing power-off processing at step S508.

Power-off processing is processing for turning on the power of the network printer 200 itself according to a power-off instruction, and when it is carried out at step S508, processing first proceeds to step S750 as shown in FIG. 23.

At step S750, whether a power-off instruction to turn the power off has been received or not is determined, and processing proceeds to step S752 if it is determined that the power-off instruction has been received (Yes), while processing is on standby at step S750 until the power-off instruction is received if it is determined that the power-off instruction has not been received (No).

At step S752, the power of the network printer 200 itself is turned off, a series of processing is ended, and a return is made to original processing.

Processing for server printer at step S408 will now be described in detail with reference to FIG. 24.

Figure 24:
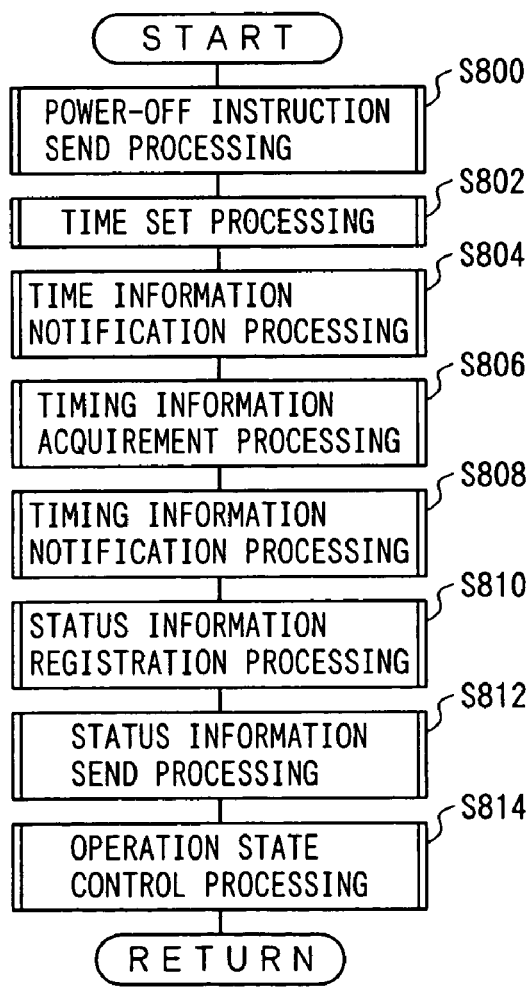
FIG. 24 is a flowchart showing processing for server printer at step S408.

FIG. 24 is a flowchart showing processing for server printer at step S408.

Processing for server printer is processing that is performed exclusively by the server printer 200, and when it is carried out at step S408, processing first proceeds to step S800 as shown in FIG. 24.

At step S800, power-off instruction send processing for sending a power-off instruction to each client printer 200 is carried out, processing proceeds to step S802, where time set processing for setting the time of the network printer 200 itself is carried out, processing proceeds to step S804, where time information notification processing for notifying the client printer 200 of time information, and processing proceeds to step S806.

At step S806, timing information acquirement processing for acquiring timing information from the printer management server 100 is carried out, processing proceeds to step S808, where timing information notification processing for notifying the client printer 200 of timing information is carried out, processing proceeds to step S810, where status information registration processing for registering status information from the client printer 200 in the storage device 62 is carried out, and processing proceeds to step S812.

At step S812, status information send processing for sending status information to the printer management server 100 is carried out, processing proceeds to step S814, where operation state control processing for controlling the operation state of the client printer 200, a series of processing is ended, and a return is made to original processing.

Power-off instruction send processing at step S800 will now be described in detail with reference to FIG. 25.

Figure 25:
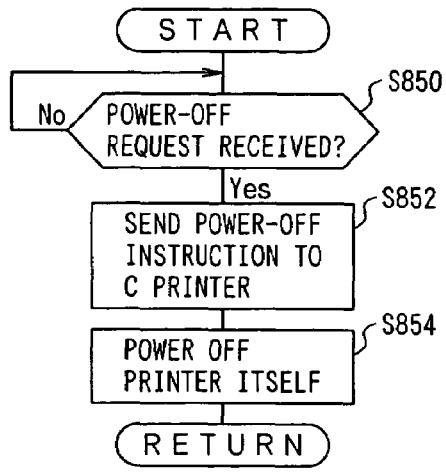
FIG. 25 is a flowchart showing power-off instruction send processing at step S800.

FIG. 25 is a flowchart showing power-off instruction send processing at step S800.

Power-off instruction send processing corresponds to power-off request input processing of FIG. 22 and power-off processing of FIG. 23, and is processing for sending a power-off instruction to each client printer 200, and when it is carried out at step S800, processing first proceeds to step S850 as shown in FIG. 25.

At step S850, whether a power-off request has been received or not is determined, and processing proceeds to step S852 if it is determined that the power-off request is received (Yes), while processing is on standby at step S850 until the power-off request is received if it is determined that the power-off request has not been received (No).

At step S852, a power-off instruction is sent to each client printer 200, processing proceeds to step S854, where the power of the network printer 200 itself is turned off, a series of processing is ended, and a return is made to original processing.

Time set processing at step S802 will now be described in detail with reference to FIG. 26.

Figure 26:
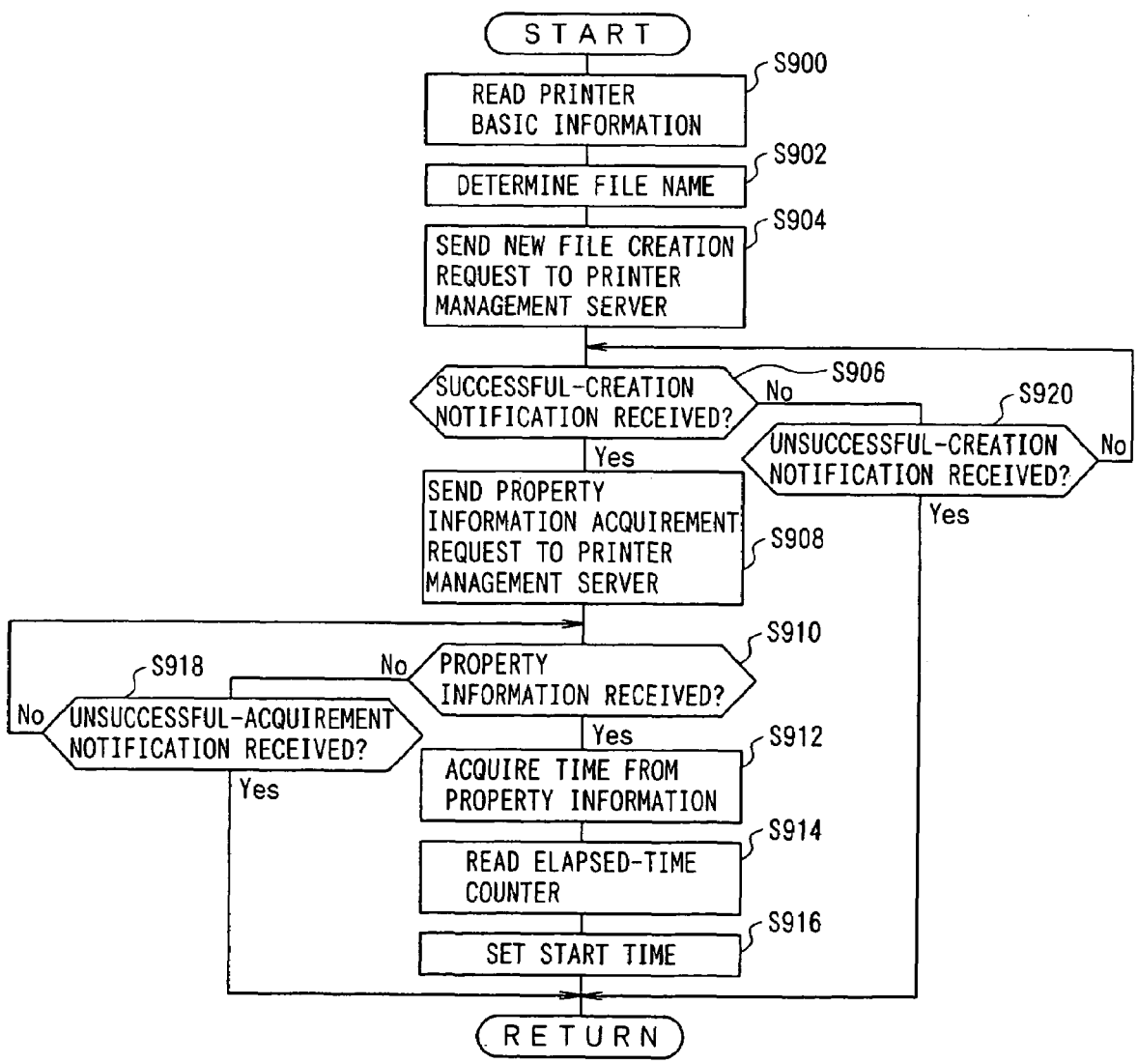
FIG. 26 is a flowchart showing time set processing at step S802.

FIG. 26 is a flowchart showing time set processing at step S802.

Time set processing corresponds to file creation processing of FIG. 7 and property information provision processing of FIG. 8, and is processing for setting the time of the network printer 200 itself, and when it is carried out at step S802, processing first proceeds to step S900 as shown in FIG. 26.

At step S900, printer basic information is read from the storage device 62, processing proceeds to step S902, where an arbitrary file name is determined, processing proceeds to step S904, where a file creation request is sent to the printer management server 100 together with the determined file name based on the read printer basic information, and processing proceeds to step S906. Specifically, a server IP address, a protocol number and a port number are used for access to the printer management server 100, and if certification is requested, certifications are made using certification information.

At step S906, whether a successful-creation notification has been received or not is determined, and if it is determined that the successful-creation notification has been received (Yes), processing proceeds to step S908, where a property information acquirement request is sent to the printer management server 100 together with the file name determined at step S902 based on the print basic information read at step S900, and processing proceeds to step S910.

At step S910, whether property information has been received or not is determined, and if it is determined that property information has been received (Yes), processing proceeds to step S912, where a creation time is acquired from the received property information, processing proceeds to step S914, where an elapsed-time counter is read from the RAM 54, and processing proceeds to step S916.

At step S916, time elapsing after start is calculated based on the read elapsed-time counter, elapsed time is subtracted from the acquired creation time to calculate start time, the calculated start time is set by storing the same in the RAM 54, a series of processing is ended, and a return is made to original processing.

On the other hand, if it is determined that property information has not been received (No) at step S910, processing proceeds to step S918, where whether an unsuccessful acquirement notification has been received or not is determined, and if it is determined that the unsuccessful acquirement notification has been received (Yes), a series of processing is ended, and a return is made to original processing.

On the other hand, if it is determined that the unsuccessful acquirement notification has not been received (No) at step S918, processing proceeds to step S910.

On the other hand, if it is determined that the successful-creation notification has not been received (No) at step S906, processing proceeds to step S920, where whether an unsuccessful-creation notification has been received or not is determined, and if it is determined that the unsuccessful-creation notification has been received (Yes), a series of processing is ended, and a return is made to original processing.

On the other hand, if it is determined that the unsuccessful-creation notification has not been received (No) at step S920, processing proceeds to step S906.

Time information notification processing at step S804 will now be described in detail with reference to FIG. 27.

Figure 27:
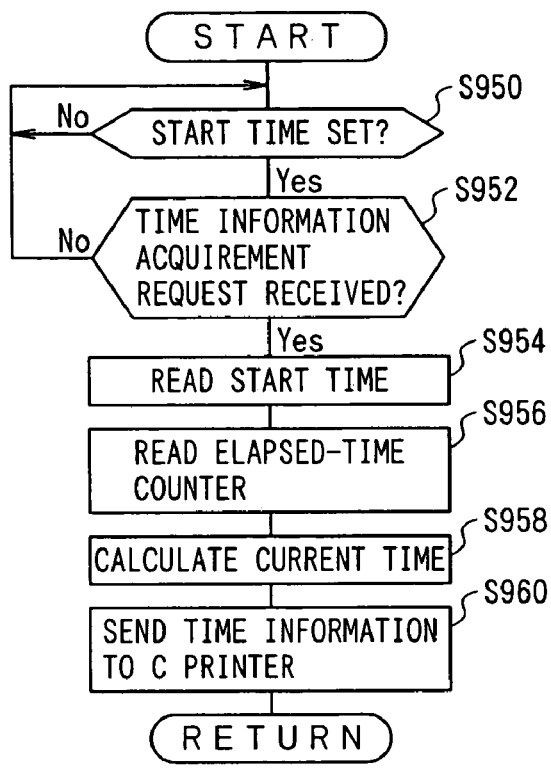
FIG. 27 is a flowchart showing time information notification processing at step S804.

FIG. 27 is a flowchart showing time information notification processing at step S804.

Time information notification processing is processing for notifying the client printer 200 of time information, and when it is carried out at step S804, processing first proceeds to step S950 as shown in FIG. 27.

At step S950, whether the start time of the network printer 200 itself has been set or not is determined, and processing proceeds to step S952 if it is determined that the start time has been set (Yes), while processing is on standby at step S950 until the start time is set if it is determined that the start time has not been set (No).

At step S952, whether a time information acquirement request for acquirement of time information has been received or not is determined, and processing proceeds to step S954 if it is determined that the time information acquirement request has been received (Yes), while processing proceeds to step S950 if it is determined that the time information acquirement request has not been received (No).

At step S954, the start time is read from the RAM 54, processing proceeds to step S956, where an elapsed-time counter is read from the RAM 54, processing proceeds to step S958, where time elapsing after start is calculated based on the read elapsed-time counter, and elapsed time is added to the read start time to calculate a current time, and processing proceeds to step S960.

At step S960, time information including the calculated current time is sent to the client printer 200 from which the request is made, a series of processing is ended, and a return is made to original processing.

Timing information acquirement processing at step S806 will now be described in detail with reference to FIG. 28.

Figure 28:
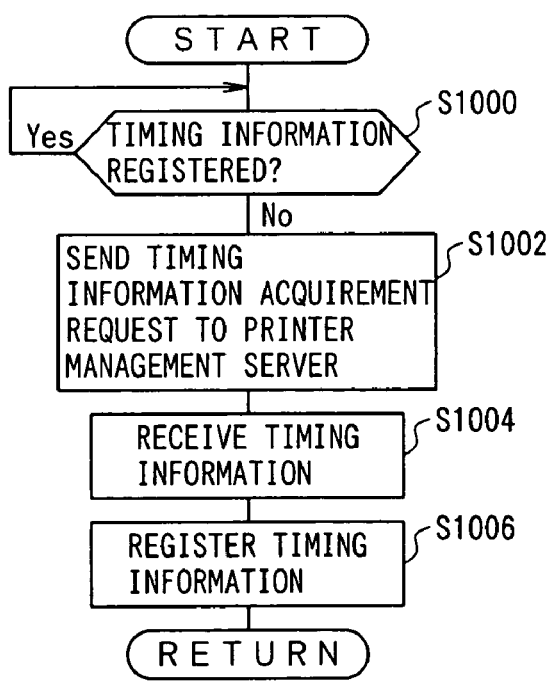
FIG. 28 is a flowchart showing timing information acquirement processing at step S806.

FIG. 28 is a flowchart showing timing information acquirement processing at step S806.

Timing information acquirement processing corresponds to timing information notification processing of FIG. 6, and is processing for acquiring timing information from the printer management server 100, and when it is carried out at step S806, processing first proceeds to step S1000 as shown in FIG. 28.

At step S1000, whether or not timing information is registered in the storage device 62 is determined, and processing proceeds to step S1002 if it is determined that timing information is not registered (No), while processing is on standby at step S1000 if it is determined that timing information is registered (Yes).

At step S1002, a timing information acquirement request is sent to the printer management server 100, processing proceeds to step S1004, where timing information is acquired, processing proceeds to step S1006, where timing information is registered in the storage device 62, a series of processing is ended, and a return is made to original processing.

Timing information notification processing at step S808 will now be described in detail with reference to FIG. 29.

Figure 29:
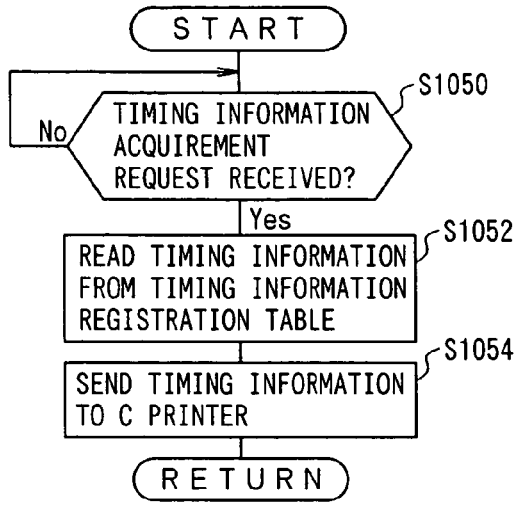
FIG. 29 is a flowchart showing timing information notification processing at step S808.

FIG. 29 is a flowchart showing timing information notification processing at step S808.

Timing information notification processing is processing for notifying the client printer 200 of timing information, and when it is carried out at step S808, processing first proceeds to step S1050 as shown in FIG. 29.

At step S1050, whether a timing information acquirement request has been received or not is determined, and processing proceeds to step S1052 if it is determined that the timing information acquirement request has been received (Yes), while processing is on standby at step S1050 until the timing information acquerement request is received if it is determined that the timing information acquerement request has not been received (No).

At step S1052, a notification date and time corresponding to the client printer 200 from which the request is made is read from the timing information registration table 550, processing proceeds to step S1054, where timing information including the read date and time is sent to the client printer 200 from which the request is made, a series of processing is ended, and a return is made to original processing.

Status information registration processing at step S810 will now be described in detail with reference to FIG. 30.

Figure 30:
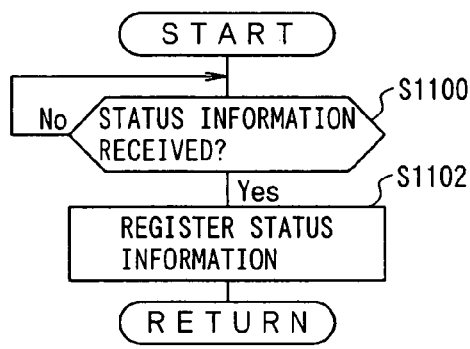
FIG. 30 is a flowchart showing status information registration processing at step S810.

FIG. 30 is a flowchart showing status information registration processing at step S810.

Status information registration processing is processing for registering status information from the client printer 200 in the storage device 62, and when it is carried out at step S810, processing first proceeds to step S1100 as shown in FIG. 30.

At step S1100, whether status information has been received or not is determined, and processing proceeds to step S1102 if it is determined that status information has been received (Yes), while processing is on standby at step S1100 until status information is received if it is determined that status information has not been received (No).

At step S1102, received status information is registered in the status information registration table for collection for each client printer 200, a series of processing is ended, and a return is made to original processing.

Status information send processing at step S812 will now be described in detail with reference to FIG. 31.

Figure 31:
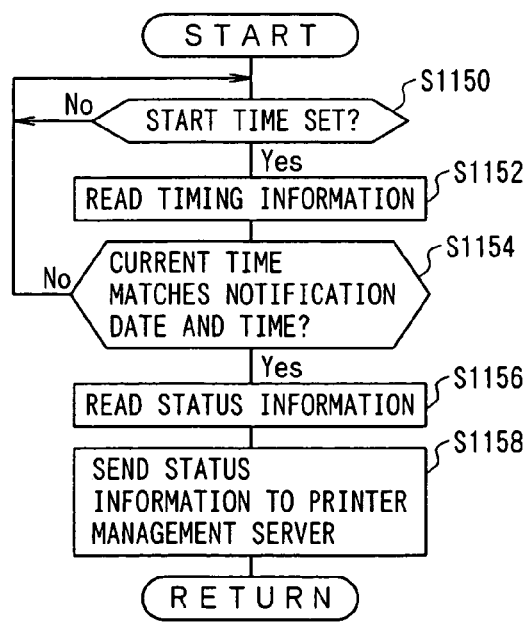
FIG. 31 is a flowchart showing status information send processing at step S812.

FIG. 31 is a flowchart showing status information send processing at step S812.

Status information send processing corresponds to status information registration processing of FIG. 9, and is processing for sending status information to the printer management server 100, and when it is carried out at step S812, processing first proceeds to step S1150 as shown in FIG. 31.

At step S1150, whether the start time of the network printer 200 itself has been set or not is determined, and processing proceeds to step S1152 if it is determined that the start time has been set (Yes), while processing is on standby at step S1150 until the start time is set if it is determined that the start time has been set (No).

At step S1152, timing information is read from the storage device 62, and processing proceeds to step S1154, where whether the current time matches a notification date and time or not is determined based on the read timing information, and processing proceeds to step S1156 if it is determined that the current time matches a notification date and time (Yes), while processing proceeds to step S1150 if it is determined that the current time does not match a notification date and time (No).

At step S1156, status information of each client printer 200 is read from the status information registration table for collection, status information is read from the status information registration table 560, processing proceeds to step S1158, where the read status information is sent to the printer management server 100, a series of processing is ended, and a return is made to original processing.

Operation state control processing at step S814 will now be described in detail with reference to FIG. 32.

Figure 32:
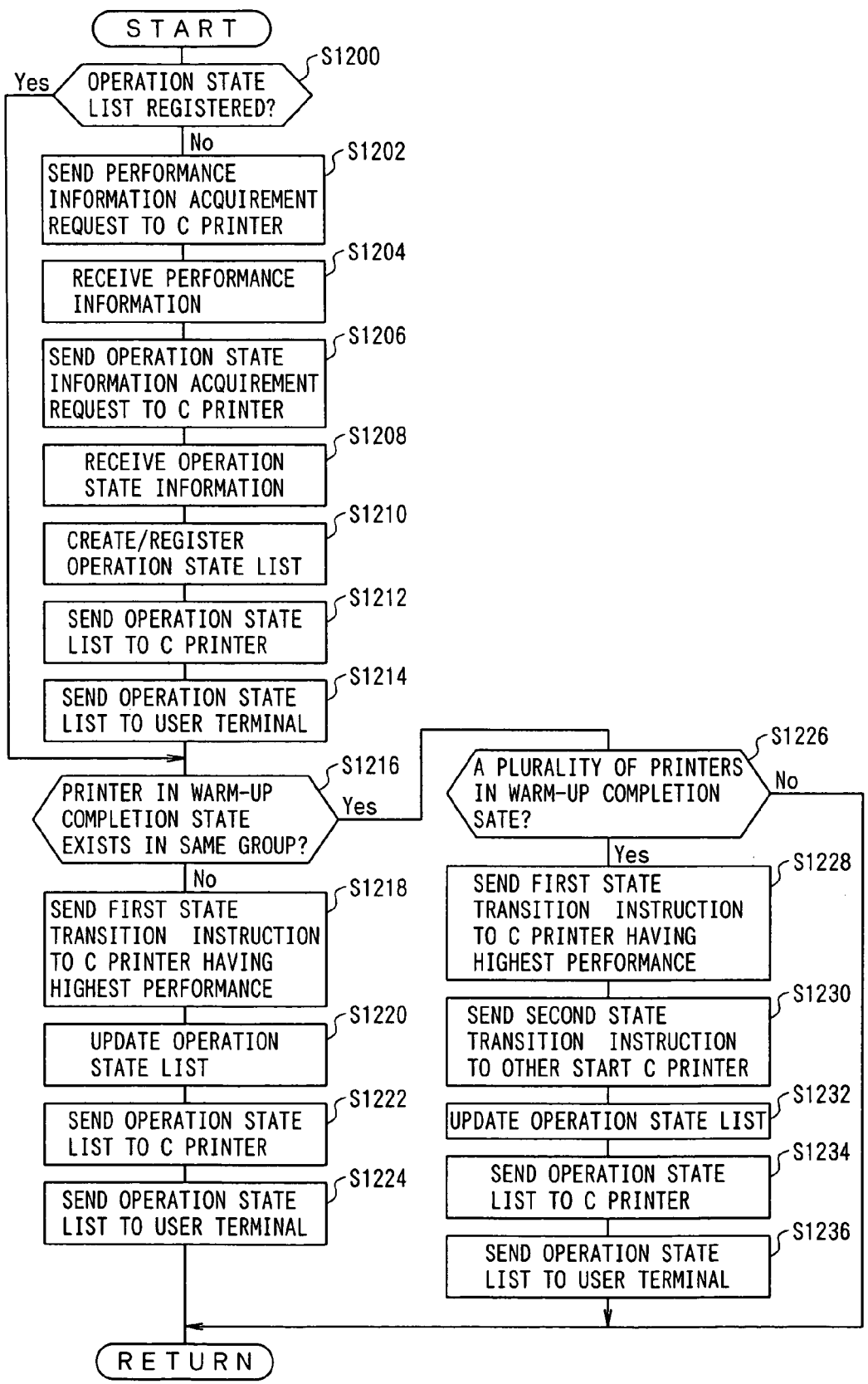
FIG. 32 is a flowchart showing operation state control processing at step S814.

FIG. 32 is a flowchart showing operation state control processing at step S814.

Operation state control processing is processing for controlling the operation state of the client printer 200, and when it is carried out at step S814, processing first proceeds to step S1200 as shown in FIG. 32.

At step S1200, whether or not the printer operation state list 512 is registered in the storage device 62 is determined, and if it is determined that the printer operation state list 512 is not registered (No), processing proceeds to step S1202, where a performance information acquerement request is sent to each client printer 200, processing proceeds to step S1204, where performance information 540 is received from each client printer 200, and processing proceeds to step S1206. Specifically, at step S1204, a printer performance list having registered performances of client printers 200 is created based on the received performance information 540, and the created printer performance list is registered in the storage device 62. The printer performance list is used when the server printer 200 specifies the client printer 200 having the highest performance and soon. Steps S1218, S1228 and S1230 are examples of the use of the printer performance list.

At step S1206, an operation state information acquerement request for acquirement of operation state information indicating the operation state of the network printer 200 is sent to each client printer 200, processing proceeds to step S1208, where operation state information is received from each client printer 200, processing proceeds to step S1210, where a printer operation state list 512 is created based on the received operation state information, and the created printer operation state list 512 is registered in the storage device 62, and processing proceeds to step S1212.

At step S1212, the created printer operation state list 512 is sent to each client printer 200, processing proceeds to step S1214, where the created printer operation state list 512 is sent to each user terminal, and processing proceeds to step S1216.

At step S1216, whether or not there exists a client printer 200 in the warm-up completion state, of client printers 200 belonging to the same group (application), is determined, and if it is determined that there exists no client printer 200 in the warm-up completion state (No), processing proceeds to step S1218, where a first state transition instruction to make a transition to the warm-up completion state is sent to the client printer 200 having the highest performance, of client printers 200 belonging to the same group, and processing proceeds to step S1220.

At step S1220, the printer operation state list 512 is updated, processing proceeds to step S1222, where the updated printer operation list 512 is sent to each client printer 200, processing proceeds to step S1224, where the updated printer operation state list 512 is sent to each user terminal, a series of processing is ended, and a return is made to original processing.

On the other hand, if it is determined that there exists a client printer 200 in the warm-up completion state, of client printers 200 belonging to the same group (Yes) at step. S1216, processing proceeds to step S1226, where whether or not there exist a plurality of client printers 200 in the warm-up completion state, of client printers 200 belonging to the same group, is determined, and if it is determined that a plurality of client printers 200 are in the warm-up completion state (Yes), processing proceeds to step S1228.

At step S1228, the first state transition instruction is sent to the client printer 200 having the highest performance, of client printers 200 belonging to the same group, processing proceeds to step S1230, where a second state transition instruction to make a transition to the sleep state is sent to the client printer 200 of which the performance is not highest, of client printers 200 belonging to the same group, and processing proceeds to step S1232.

At step S1232, the printer operation state list 512 is updated, processing proceeds to step S1234, where the updated printer operation list 512 is sent to each client printer 200, where processing proceeds to step S1236, where the updated printer operation list 512 is sent to each user terminal, a series of processing is ended, and a return is made to original processing.

On the other hand, if it is determined that a plurality of client printers 200, of client printers 200 belonging to the same group, are not in the warm-up completion state (No) at step S1226, a series of processing is ended, and a return is made to original processing.

On the other hand, if it is determined that the printer operation state list 512 is registered in the storage device 62 (Yes) at step S1200, processing proceeds to step S1216.

Processing for client printer at step S412 will now be described in detail with reference to FIG. 33.

Figure 33:
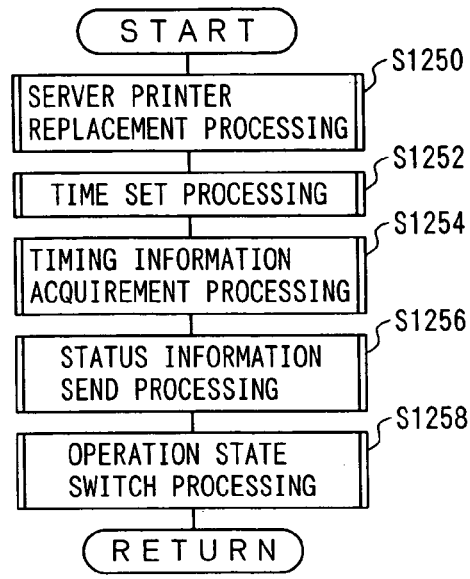
FIG. 33 is a flowchart showing processing for client at step S412.

FIG. 33 is a flowchart showing processing for client printer at step S412.

Processing for client printer is processing to be performed exclusively by the client printer 200, and when it is carried out at step S412, processing first proceeds to step S1250 as shown in FIG. 33.

At step S1250, server printer replacement processing for replacing the server printer 200 is carried out, processing proceeds to step S1252, where time set processing for setting the time of the network printer 200 itself is carried out, processing proceeds to step S1254, where timing information acquisition processing for acquiring timing information from the server printer 200 is carried out, and processing proceeds to step S1256.

At step S1256, status information send processing for sending status information to the server printer 200 is carried out, processing proceeds to step S1258, where operation state switch processing for switching the operation state of the network printer 200 is carried out, a series of processing is ended, and a return is made to original processing.

Server printer replacement processing at step S1250 will now be described in detail with reference to FIG. 34.

Figure 34:
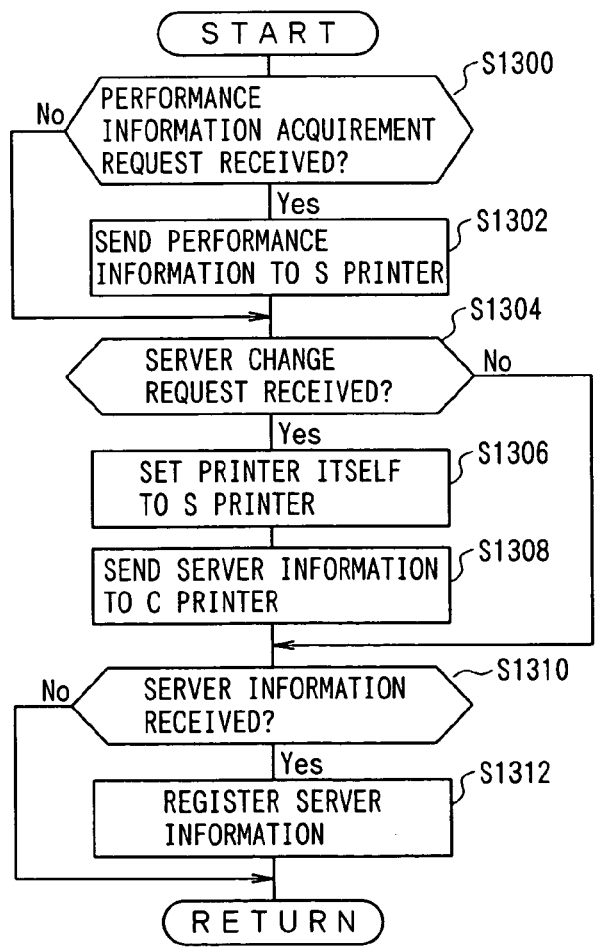
FIG. 34 is a flowchart showing server printer replacement processing at step S1250.

FIG. 34 is a flowchart showing server printer replacement processing at step S1250.

Server printer replacement processing corresponds to server printer determination processing of FIG. 20, and is processing for replacing the server printer 200, and when it is carried out at step S1250, processing first proceeds to step S1300 as shown in FIG. 34.

At step S1300, whether a performance information acquirement request has been received or not is determined, and if it is determined that the performance information acquirement request has been received (Yes), processing proceeds to step S1302, where performance information 540 is read from the storage device 62, and the read performance information 540 is sent to the server printer 200, and processing proceeds to step S1304.

At step S1304, whether a server replacement request has been received or not is determined, and if it is determined that the server replacement request has been received (Yes), processing proceeds to step S1306, where the network printer 200 itself is set to the server printer 200, processing proceeds to step S1308, where server information including the IP address of the network printer 200 itself is sent to each client printer 200, and processing proceeds to step S1310.

At step S1310, whether server information has been received or not is determined, if it is determined that server information has been received (Yes), processing proceeds to step S1312, where the received server information is registered in the storage device 62, a series of processing is ended, and a return is made to original processing.

On the other hand, if it is determined that server information has not been received (No) at step S1310, a series of processing is ended, and a return is made to original processing.

On the other hand, if it is determined that the server replacement request has not been received (No) at step S1304, processing proceeds to step S1310.

On the other hand, if it is determined that the performance information acquirement request has not been received (No) at step S1300, processing proceeds to step S1304.

Time set processing at step S1252 will now be described in detail with reference to FIG. 35.

Figure 35:
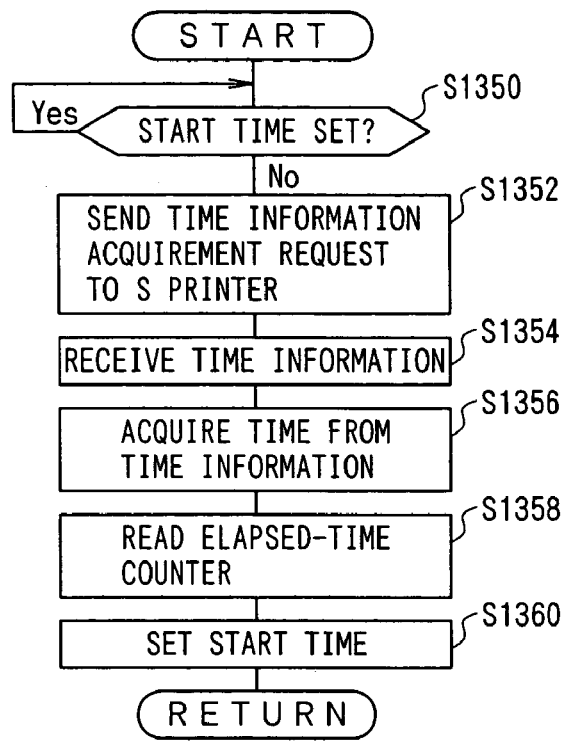
FIG. 35 is a flowchart showing time set processing at step S1252.

FIG. 35 is a flowchart showing time set processing at step S1252.

Time set processing corresponds to time information notification processing of FIG. 27, and is processing for setting the time of the network printer 200 itself, and when it is carried out at step S1252, processing first proceeds to step S1350 as shown in FIG. 35.

At step S1350, whether the start time of the network printer 200 itself is set or not is determined, and processing proceeds to step S1352 if it is determined that the start time is not set (No), while processing is on standby at step S1350 if it is determined that the start time is set (Yes).

At step S1352, a time information acquirement request is sent to the server printer 200, processing proceeds to step S1354, where time information is received, processing proceeds to step S1356, where the current time is acquired from the received time information, processing proceeds to step S1358, where an elapsed-time counter is read from the RAM 54, and processing proceeds to step S1360.

At step S1360, time elapsing after start is calculated based on the read elapsed-time counter, the elapsed time is subtracted from the acquired current time to calculate a start time, the calculated start time is set by storing the same in the RAM 54, a series of processing is ended, and a return is made to original processing.

Timing information acquirement processing at step S1254 will now be described in detail with reference to FIG. 36.

Figure 36:
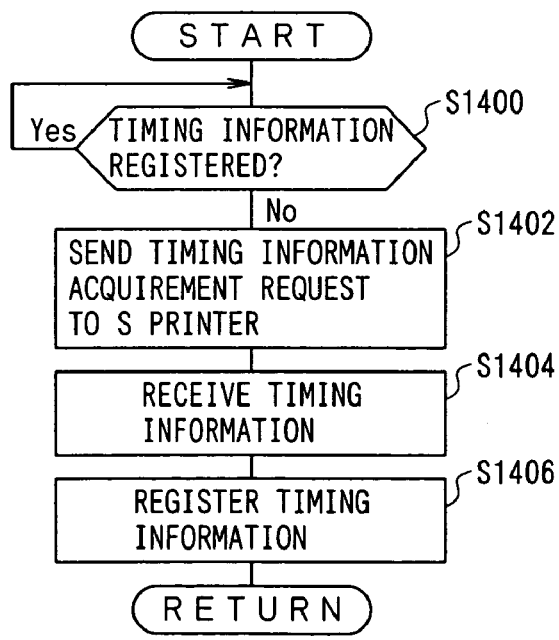
FIG. 36 is a flowchart showing timing information acquirement processing at step S1254.

FIG. 36 is a flowchart showing timing information acquirement processing at step S1254.

Timing information acquirement processing corresponds to timing information notification processing of FIG. 29, and is processing for acquiring timing information from the server printer 200, and when it is carried out at step S1254, processing first proceeds to step S1400 as shown in FIG. 36.

At step S1400, whether or not timing information is registered in the storage device 62 is determined, and processing proceeds to step S1402 if it is determined that timing information is not registered (No), while processing is on standby at step S1400 if it is determined that timing information is registered (Yes).

At step S1402, a timing information acquirement request is sent to the server printer 200, processing proceeds to step S1404, where timing information is received, processing proceeds to step S1406, where timing information is registered in the storage device 62, a series of processing is ended, and a return is made to original processing.

Status information send processing at step S1256 will now be described in detail with reference to FIG. 37.

Figure 37:
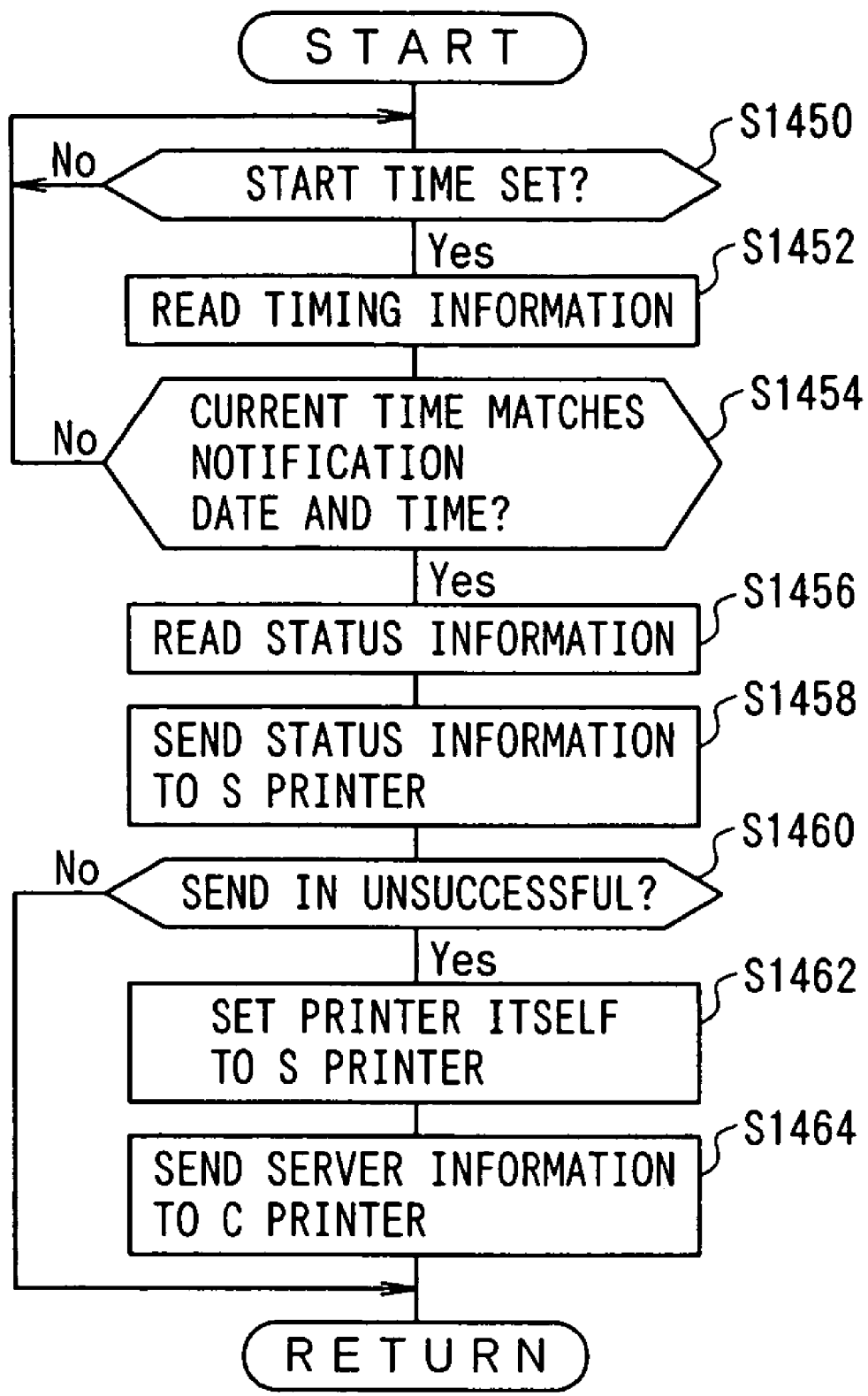
FIG. 37 is a flowchart showing status information send processing at step S1256.

FIG. 37 is a flowchart showing status information send processing at step S1256.

Status information send processing corresponds to status information registration processing of FIG. 30, and is processing for sending status information to the server printer 200, and when it is carried out at step S1256, processing first proceeds to step S1450 as shown in FIG. 37.

At step S1450, whether the start time of the network printer 200 itself is set or not is determined, and processing proceeds to step S1452 if it is determined that the start time is set (Yes), while processing is on standby at step S1450 until the start time is set if it is determined that the start time is not set (No).

At step S1452, timing information is read from the storage device 62, and processing proceeds to step S1454, where whether the current time matches a notification date and time or not is determined based on the read timing information, and processing proceeds to step S1456 if it is determined that the current time matches the notification date and time (Yes), while processing proceeds to step S1450 if it is determined that the current time does not match the notification date and time (No).

At step S1456, status information of the network printer 200 itself is read from the status information registration table 560, processing proceeds to step S1458, where the read status information is sent to the server printer 200, processing proceeds to step S1460, where whether the sending of status information is unsuccessful or not is determined, and processing proceeds to step S1462 if its is determined that the sending of status information is unsuccessful (Yes).

At step S1462, the network printer 200 itself is set to the server printer 200, processing proceeds to step S1464, where server information including the IP address of the network printer 200 itself is sent to each client printer 200, a series of processing is ended, and a return is made to original processing.

On the other hand, if it is determined that the sending of status information is successful (No) at step S1460, a series of processing is ended, and a return is made to original processing.

Operation state switch processing at step S1258 will now be described in detail with reference to FIG. 38.

Figure 38:
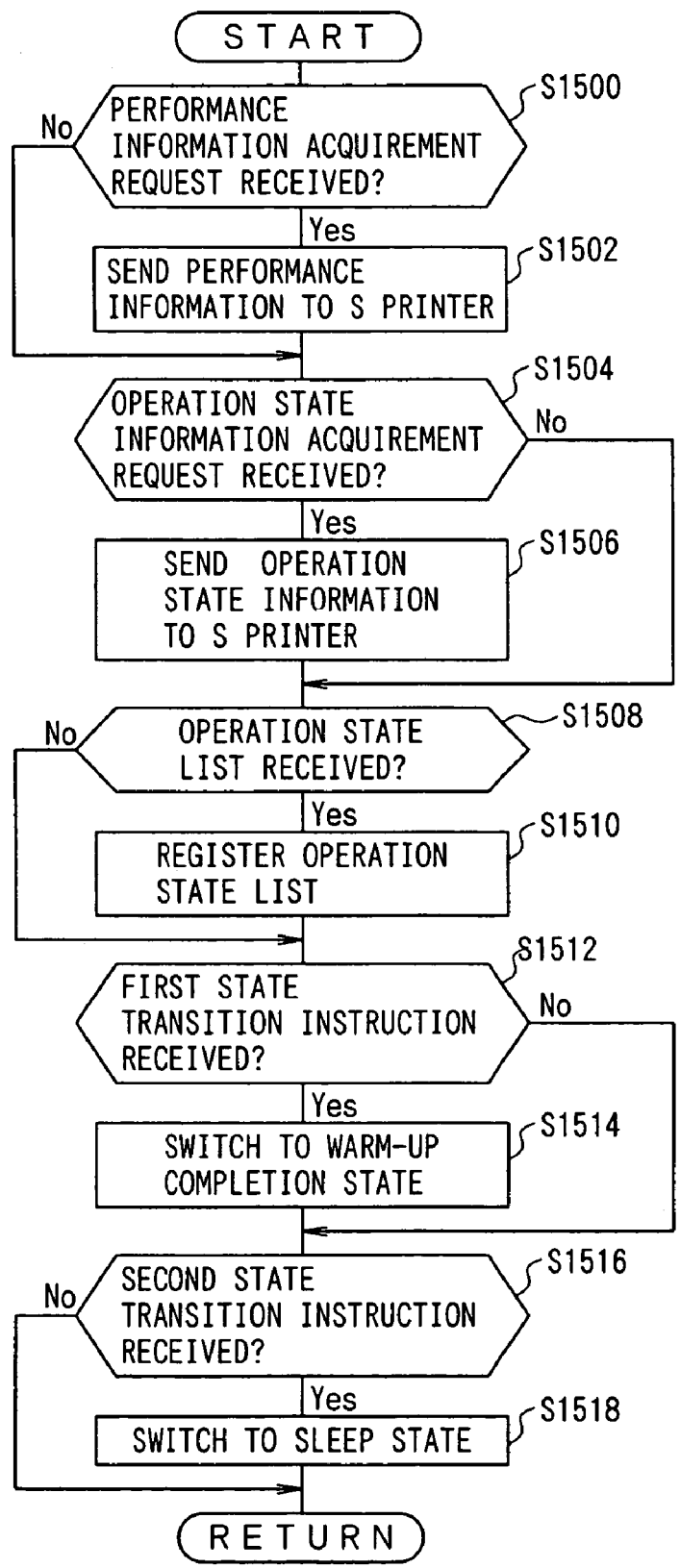
FIG. 38 is a flowchart showing operation state switch processing at step S1258.

FIG. 38 is a flowchart showing operation state switch processing at step S1258.

Operation state switch processing corresponds to operation state control processing of FIG. 32, and is processing for switching the operation state of the network printer 200 itself, and when it is carried out at step S1258, processing first proceeds to step S1500 as shown in FIG. 38.

At step S1500, whether a performance information acquirement request has been received or not is determined, and if it is determined that the performance information acquirement request has been received (Yes), processing proceeds to step S1502, where performance information 540 is read from the storage device 62, and the read performance information 540 is sent to the server printer 200, and processing proceeds to step S1504.

At step S1504, whether an operation state information acquirement request has been received or not is determined, and if it is determined that the operation state information acquirement request has been received (Yes), processing proceeds to step S1506, where operation state information indicating the current state of the network printer 200 itself is generated, and the generated operation state information is sent to the server printer 200, and processing proceeds to step S1508.

At step S1508, whether the print operation state list 512 has been received or not is determined, and if it is determined that the printer operation state list 512 has been received (Yes), processing proceeds to step S1510, where the received printer operation state list 512 is registered in the storage device 62, and processing proceeds to step S1512.

At step S1512, whether a first state transition instruction has been received or not is determined, and if it is determined that the first state transition instruction has been received (Yes), processing proceeds to step S1514, where the operation state of the network printer 200 itself is switched to a warm-up completion state, and processing proceeds to step S1516.

At step S1516, whether a second state transition instruction has been received or not is determined, and if it is determined that the second state transition instruction has been received (Yes), processing proceeds to step S1518, where the operation state of the network printer 200 is switched to a sleep state, a series of processing is ended, and a return is made to original processing.

On the other hand, if it is determined that the second state transition instruction has not been received (No) at step S1516, a series of processing is ended, and a return is made to original processing.

On the other hand, if it is determined that the first state transition instruction has not been received (No) at step S1512, processing proceeds to step S1516.

On the other hand, if it is determined that the printer operation state list 512 has not been received (No) at step S1508, processing proceeds to step S1512.

On the other hand, if it is determined that the operation state information acquirement request has not been received (No) at step S1504, processing proceeds to step S1508.

On the other hand, if it is determined that the performance information acquirement request has not been received (No) at step S1500, processing proceeds to step S1504.

Operations of this embodiment will now be described.

First, the case will be described where the server printer 200 is determined.

In the network printer 200, other network printer 200 is retrieved from the same sub-network 198 through step S602 when the power is turned on by a user. If as a result, no other network printer 200 is retrieved, the network printer 200 itself is set to the server printer 200, and a power-on instruction is sent to a network printer 200 that is not started, of network printers 200 belonging to the same sub-network 198 through steps S606 and S608.

In the network printer 200 that is not started, the power of the network printer 200 itself is turned on through step S452 when a power-on instruction is received. Other network printer 200 is retrieved from the same sub-network 198 through step S602, but because the server printer 200 already exists, the network printer 200 itself is set to the client printer 200 through step S622.

Furthermore, in the server printer 200, a performance information acquirement request is sent to each client printer 200 through step S610.

In the client printer 200, when the performance information acquirement request is received, performance information 540 is read from the storage device 62 through step S1302, and the read performance information 540 is sent to the server printer 200.

In the server printer 200, when performance information 540 is received from each client printer 200, whether or not the performance of the client printer 200 is higher than the performance of the network printer 200 itself is determined based on the received performance information and performance information 540 in the storage device 62 through step S614. If as a result, it is determined that the performance of the client printer 200 is higher, a server change request is sent to the client printer 200 having the highest performance, and the network printer 200 itself is set to the client printer 200 through steps S618 and S620.

In the client printer 200, when the server change request is received, the network printer 200 is set to the server printer 200, and server information is sent to each client printer 200 through steps S1306 and S1308.

In the client printer 200, when server information is received, the received server information is registered in the storage device 62 through step S1312.

Furthermore, in the server printer 200, if it is determined that the performance of the network printer 200 itself is higher, server information is sent to each client printer 200 through step S616.

In this way, if any of network devices 200 is powered on, all network printers 200 belonging to the same sub-network 198 are powered on, and any of network printers 200 belonging to the same sub-network 198 dynamically becomes the server printer 200, and the others become client printers 200.

The case will now be described where the time of the network printer 200 is set.

In the server printer 200, when the power is turned on, the elapsed-time counter of the RAM 54 is initialized through step S552. Thereafter, the elapsed-time counter is read from the RAM 54, "1" is added to the read elapsed-time counter, and the elapsed-time counter is stored in the RAM 54 through steps S554 to S558 repeatedly at predetermined intervals (of 100 (ms), for example).

In the server printer 200, if the start time is not set, printer basic information is read from the storage device 62, an arbitrary file name is determined, and a file creation request is sent to the printer management server 100 together with the determined file name based on the read printer basic information, through steps S900 to S904.

In the printer management server 100, when the file creation request is received, a file of the file name designated by the file creation request is newly created in the storage device through step S204. If the creation of the file is successful, a successful-creation notification is sent to the server printer 200 through step S208.

In the server printer 200, when the successful-creation notification is received, a property information acquirement request is sent to the printer management server 100 together with the determined file name based on the read printer basic information through step S908.

In the printer management server 100, when the property information acquirement request is received, property information is created for a file of the file name designated by the property information acquirement request, of files in the storage device 62, through step S254. If the creation of property information is successful, the created property information is sent to the server printer 200 through step S258.

In the server printer 200, when property information is received, a creation time is acquired from the received property information, and an elapsed-time counter is read from the RAM 54 through steps S912 and S914. Time elapsing after start is calculated based on the read elapsed-time counter, elapsed time is subtracted from the acquired creation time to calculate a start time, and the calculated start time is stored in the RAM 54 through step S916. Consequently, the start time is set in the server printer 200.

On the other hand, in the client printer 200, when the power is turned on, the elapsed-time counter of the RAM 54 is initialized through step S552. Thereafter, the elapsed-time counter is read from the RAM 54, "1" is added to the read elapsed-time counter, and the elapsed-time counter is stored in the RAM 54 through steps S554 to S558 at predetermined intervals (of 100 (ms), for example).

In the client printer 200, if the start time is not set, a time information acquirement request is sent to the server printer 200 through step S1352.

In the server printer 200, when the time information acquirement request is received, a start time and an elapsed-time counter are read from the RAM 54, time elapsing after start is calculated based on the read elapsed-time counter, and elapsed-time is added to the read start time to calculate the current time through steps S954 to S958. Time information including the calculated current time is sent to the client printer 200 through step S960.

In the client printer 200, when time information is received, the current time is acquired from the received time information, and an elapsed-time counter is read from the RAM 54 through steps S1356 and S1358. Time elapsing after start is calculated based on the read elapsed-time counter, elapsed time is subtracted from the acquired current time to calculate a start time, and the calculated start time is stored in the RAM 54 through step S1360. Consequently, the start time is stored in the client printer 200.

The case will now be described where access timing of the network printer 200 is set.

In the server printer 200, if timing information is not registered, a timing information acquirement request is sent to the printer management server 100 through step S1002.

In the printer management server 100, when the timing information acquirement request is received, a notification date and time corresponding to the server printer 200 from which the request is made is read from the timing information registration table 410, and timing information including the read notification date and time is sent to the server printer 200 through steps S152 and S154.

In the server printer 200, when timing information is received, timing information is registered in the storage device 62 through step S1006.

In the timing information registration table 410, access timing is defined for each server printer 200 so that access by server printers 200 is dispersed, and therefore if each server printer 200 makes access to the printer management server 100 based on timing information, access by a plurality of server printers 200 is dispersed.

On the other hand, in the client printer 200, if timing information is not registered, a timing information acquirement request is sent to the server printer 200 through step S1402.

In the server printer 200, when the timing information acquirement request is received, a notification date and time corresponding to the client printer 200 from which the request is made is read from the timing information registration table 550, and timing information including the read notification date and time is sent to the client printer 200 through steps S1052 and S1054.

In the client printer 200, when timing information is received, timing information is registered in the storage device 62 through step S1406.

In the timing information registration table 550, access timing is defined for each client printer 200 so that access by client printers 200 is dispersed, and therefore if each client printer 200 makes access to the server printer 200 based on timing information, access by a plurality of client printers 200 is dispersed.

The case will now be described where status information of the network printer 200 is collected.

In the client printer 200, when a notification date and time specified by timing information in the storage device 62 comes, status information of the network printer 200 itself is read from the status information registration table 560, and the read status information is sent to the server printer 200 through steps S1456 and S1458.

In the server printer 200, when status information is received, the received status information is registered in the status information registration table for collection for each client printer 200 through step S1102.

On the other hand, in the server printer 200, when the notification date and time specified by timing information in the storage device 62 comes, status information of each client printer 200 is read from the status information registration table for collection, status information of the network printer 200 itself is read from the status information registration table 560, and the read status information is sent to the printer management server 100 through steps S1156 and S1158.

In the printer management server 100, when status information is received, the received status information is registered in the status information registration table for collection for each network printer 200 through step S302.

The case will now be described where a failure occurs in the server printer 200.

In the client printer 200, if a failure occurs in the server printer 200, and the sending of status information is unsuccessful, the network printer 200 itself is set to the server printer 200, and server information is sent to each client printer 200 through steps S1462 and S1464.

The case will now be described where the operation state of the network printer 200 is controlled.

In the server printer 200, a performance information acquirement request is first sent to each client printer 200 through step S1202.

In the client printer 200, when the performance information acquirement request is received, performance information 540 is read from the storage device 62, and the read performance information 540 is sent to the server printer 200 through step S1502.

In the server printer 200, when the performance information 540 is received from each client printer 200, a printer performance list is created based on the received performance information 540, and the created printer performance list is registered in the storage device 62 through step S1206. An operation state information acquirement request is sent to each client printer 200 through step S1206.

In the client printer 200, when operation state information acquirement request is received, operation state information indicating the current operation state of the network printer 200 itself is generated, and the generated operation state information is sent to the server printer 200.

In the server printer 200, when operation state information is received from each client printer 200, a printer operation state list 512 is created based on the received operation state information, and the created printer operation state list 512 is registered in the storage device 62 through step S1210. The created printer operation state list 512 is sent to each client printer 200 and each user terminal.

In the client printer 200, when the printer operation state list 512 is received, the received printer operation state list 512 is registered in the storage device 62 through step S1510.

In this way, the printer operation state list 512 required for controlling the operation state of the network printer 200 is created.

In the server printer 200, when the printer operation state list 512 is created, whether or not there exists a client printer 200 in the warm-up completion state, of client printers 200 belonging to the same group, is determined through step S1216. If as a result, it is determined that there exists no client printer 200 in the warm-up completion state, a first state transition instruction is sent to the client printer 200 having the highest performance, of client printers 200 belonging to the same group, through step S1218.

In the client printer 200, when the first state transition instruction is received, the operation state of the network printer 200 itself is switched to the warm-up completion state through step S1514.

On the other hand, in the server printer 200, if it is determined that there exists a client printer 200 in the warm-up completion state, whether a plurality of client printers 200 are in the warm-up completion state, of client printers 200 belonging to the same group, is determined through step S1226. If as a result, it is determined that a plurality of client printers 200 are in the warm-up completion state, the first state transition instruction is sent to the client printer 200, of client printers 200 belonging to the same group, and a second state transition instruction is sent to client printers 200 of which the performance is not the highest, of client printers 200 belonging to the same group, through steps 1228 and S1230.

In the client printer 200, when the first state transition instruction is received, the operation state of the network printer 200 itself is switched to the warm-up completion state through step S1514.

In the client printer 200, when the second state transition instruction is received, the operation state of the network printer 200 itself is switched to the sleep state through step S1518.

The case will now be described where printing is performed by any network printer 200 at a user terminal.

If printing is performed by any network printer 200, a user inputs a print request and designates the network printer 200 in the user terminal.

Figure 39:
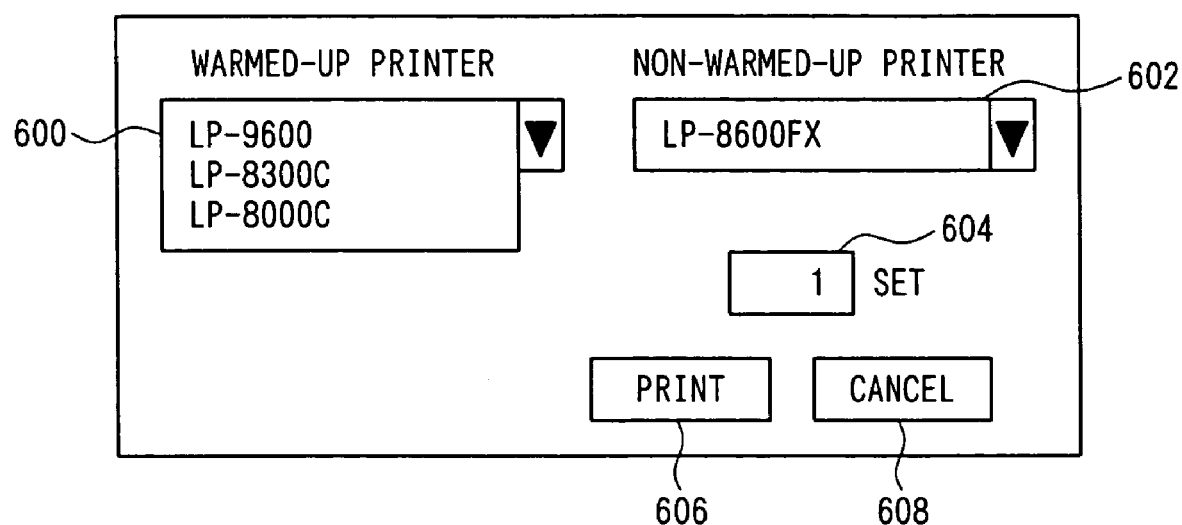
FIG. 39 shows a GUI showing a print request screen in a user terminal.
Figure 40:
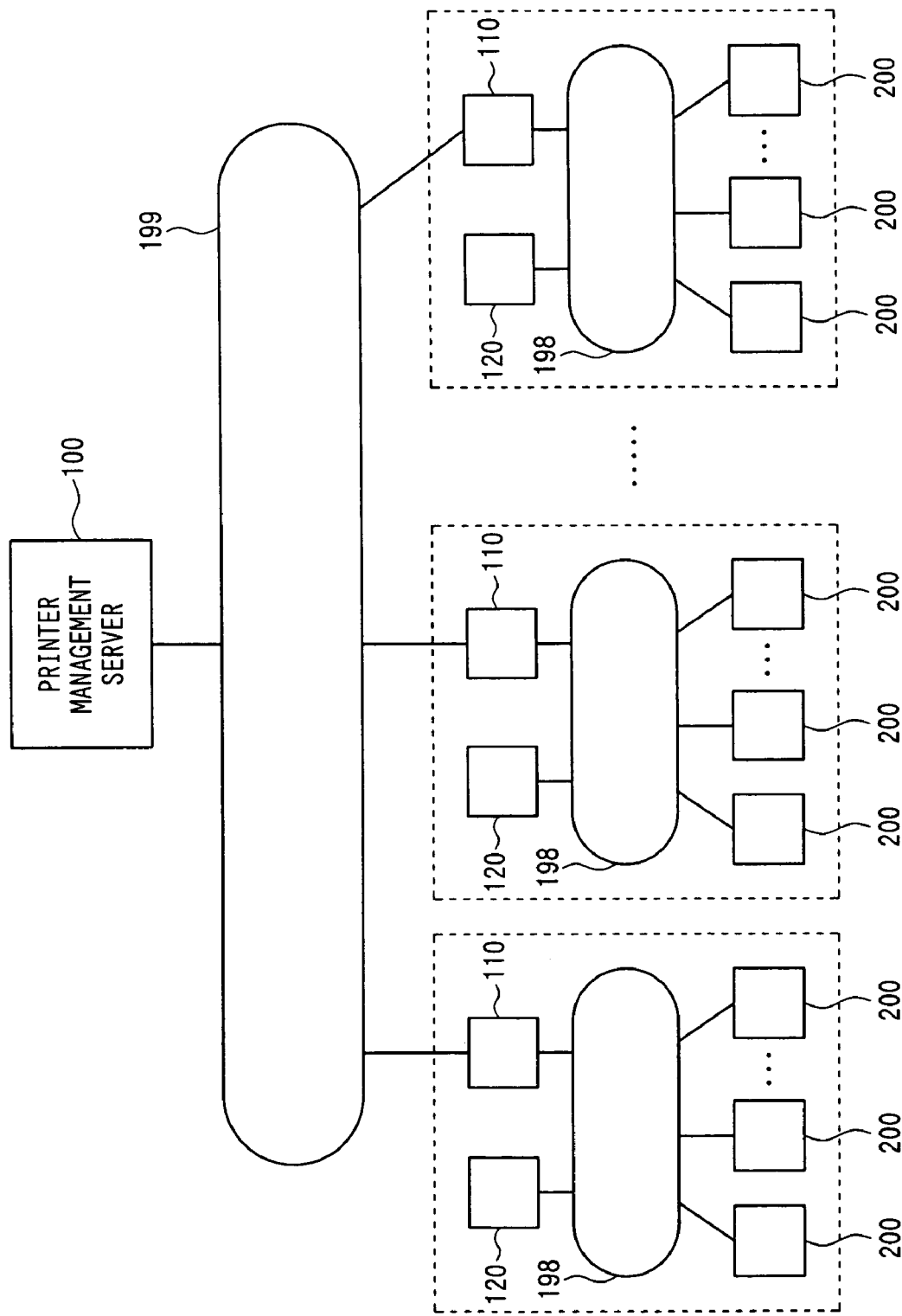
FIG. 40 is a block diagram showing a configuration of a conventional printer management system.

FIG. 39 is a GUI showing a print request screen in the user terminal.

In the user terminal, when s print request is inputted, a print request screen shown in FIG. 39 is displayed. In the user terminal, the printer operation state list 512 sent is received from the server printer 200, and therefore the network printer 200 in the warm-up completion state and the network printer 200 in the sleep state can be recognized. The print request screen of FIG. 39 is provided with a list box 600 in which a list of network printers 200 in the warm-up completion state is displayed, a list box 602 in which a list of network printers 200 in the sleep state is displayed, a text box 604 to which a number of prints is inputted, a print button 606 for providing instructions to perform printing, and a cancel button 608 for providing instructions to stop printing.

Here, if the user designates the network printer 200 in the warm-up completion state to perform printing, for example, a print instruction and print data are sent to the network printer 200 in the warm-up completion state.

In the network printer 200, when the print instruction and print data are received, printing is performed by the printing device 64 based on the received print data through step S656 because the operation state of the network printer 200 itself is the warm-up completion state.

In addition, if the user designates the network printer 200 in the sleep state to perform printing, for example, a print instruction and print data are sent to the network printer 200 in the sleep state.

In the network printer 200, when the print instruction and print data are received, the printer operation state list 512 is read from the storage device 62, and print data is transferred to other network printer 200 in the warm up completion state based on the read printer operation state list 512 through step S662, because the operation state of the network printer 200 itself is the warm-up completion state. The user terminal is notified of guide information about the network printer 200 to which print data is transferred, through step S666.

In other network printer 200, when print data is received, printing is performed by the printing device 64 based on the received print data through step S656 because the operation state of the network printer 200 itself is the warm-up completion state.

In addition, in the user terminal, when guide information is received, the received guide information is displayed on a display or the like. In this way, the user can recognize the name, location and the like of the network printer 200 to which print data is transferred.

The case will now be described where the power of the network printer 200 is turned off.

When the power is turned off at a time, the user inputs a power-off request from an operation panel 60 in any network printer 200.

In the client printer 200, when the power-off request is inputted, the power-off request is sent to the server printer 200 through step S702.

In the server printer 200, when the power-off request is received, a power-off instruction is sent to each client printer 200, and the power of the network printer 200 itself is turned off through steps S852 and S854.

In the client printer 200, when the power-off instruction is received, the power of the network printer 200 itself is turned off through step S752.

In this way, if the power-off request is inputted in any network printer 200, all network printers 200 belonging to the same sub-network 198 are powered off.

In this way, in this embodiment, the printer management server 100 notifies the server printer 200 of timing information indicating access timing corresponding to the server printer 200 with reference to the timing information registration table 410, and the network printer 200 receives timing information, and sends status information of the status information registration table for collection to the printer management server 100 based on the received timing information when the network printer 200 itself is the server printer 200.

In this way, because access by a plurality of server printers 200 is hard to be focused on the printer management server 100, an increase in communication traffic can be inhibited, and the possibility that an excessive process load is applied to the printer management server 100 can be reduced compared to the conventional technique.

Furthermore, in this embodiment, the network printer 200 notifies the client printer 200 of timing information indicating access timing corresponding to the client printer 200 with reference to the timing information registration table 550 when the network printer 200 itself is the server printer 200, and receives timing information and sends status information of the status information registration table 560 to the server printer 200 based on the received timing information when the network printer 200 itself is the client printer 200.

In this way, because access by a plurality of client printers 200 is hard to be focused on the server printer 200, an increase in communication traffic can be inhibited, and the possibility that an excessive process load is applied to the server printer 200 can be reduced.

Furthermore, in this embodiment, the timing information registration table 410 defines as access timing a notification date and time when access to the printer management server 100 is started for each server printer 200 so that access periods of server printers 200 do not overlap one another.

In this way, because access by a plurality of server printers 200 is effectively dispersed, and access is harder to be focused on the printer management server 100, an increase in communication traffic can be further inhibited, and the possibility that an excessive process load is applied to the printer management server 100 can be further reduced.

Furthermore, in this embodiment, the timing information registration table 550 defines as access timing a notification date and time when access to the server printer 200 is started for each client printer 200 so that access periods of client printers 200 do not overlap one another.

In this way, because access by a plurality of client printers 200 is effectively dispersed, and access is harder to be focused on the server printer 200, an increase in communication traffic can be further inhibited, and the possibility that an excessive access is applied to the server printer 200 can be further reduced.

Furthermore, in this embodiment, the network printer 200 can be set to any one of the server printer 200 and the client printer 200, and the network printer 200 sends status information of the status information registration table 560 to the server printer 200 when the network printer 200 itself is the client printer 200, and registers received status information in the status information registration table for collection when status information is received if the network printer 200 itself is the server printer 200.

In this way, because it is not necessary to provide a printer management server for each sub-network 198, costs and time and efforts required for introduction and maintenance can be reduced compared to the conventional techniques. In addition, any of a plurality of network printers 200 can serve as a server, and therefore even if a failure occurs in a certain network printer 200, the possibility that the service by the network printer 200 stops is low. Thus, reliability against failures can be improved compared to the conventional technique.

Furthermore, in this embodiment, the network printer 200 sends status information of the status information registration table for collection to the printer management server 100 when the network printer 200 itself is the server printer 200.

In this way, the server printer 200 sends status information of network printers 200 to the printer management server 100, and therefore a process load on the printer management server 100 can be reduced compared to the configuration in which each network printer 200 sends status information separately.

Furthermore, in this embodiment, the network printer 200 spontaneously sends status information of the status information registration table 560 to the server printer 200 when the network printer 200 itself is the client printer 200.

In this way, a process load on the server printer 200 and a communication traffic on the network can be reduced compared to the configuration in which the server printer 200 polls the client printer 200 at predetermined intervals to acquire status information.

Furthermore, in this embodiment, the network printer 200 sets the network printer 200 itself to the server printer 200 when it is determined that there exists no starting network printer 200 other than the network printer 200 itself in the same sub-network 198.

In this way, it is not necessary to set in advance the network printer 200 serving as the server printer 200, thus making it possible to reduce time and efforts required for setting of the system.

Furthermore, in this embodiment, when the network printer 200 itself is the server printer 200, the network printer 200 compares the performance of the network printer 200 itself to the performance of the client printer 200, and if the network printer 200 determines that the performance of the client printer 200 is higher, the network printer 200 sends a server change request to the client printer 200 and sets the network printer 200 itself to the client printer 200, and sets the network printer 200 itself to the server printer when it receives the server change request.

In this way, the network printer 200 having a relatively high performance in the same sub-network becomes the server printer 200, thus making it possible to effectively collect status information.

Furthermore, in this embodiment, in case where the server printer 200 becomes inoperative, the network printer 200 selects a client printer 200 having the highest performance and switches the selected client printer 200 to the server printer 200.

In this way, even if the server printer 200 becomes inoperative due to occurrence of a failure or the like in the server printer 200, other starting network printer 200 becomes the server printer 200, and therefore the possibility that the service by the network printer 200 stops can be further reduced. Thus, reliability against failures can be further improved.

In addition, the network printer 200 having the highest performance, of a plurality of network printers 200, becomes the server printer 200, thus making it possible to efficiently continue collection of status information even if the server printer 200 becomes inoperative due to occurrence of a failure or the like in the server printer 200.

Furthermore, in this embodiment, the printer management server 100 receives a file creation request, it creates a file related to the file creation request, and stores the created file in the storage device 42 together with the creation time, and when the printer management server 100 receives a property information acquirement request, it creates property information for a file related to the property information acquirement request, of files in the storage device 42, and sends the created property information to the server printer 200, and when the network printer 200 itself is the server printer 200, the network printer 200 sends the file creation request and the property information acquirement request to the printer management server 100, and sets a time based on the a time of creation of the file included in property information when receiving the property information.

In this way, a function of recording a file together with a time of creation of the file and a function of providing the time of creation of the file to the server printer 200 can be used as a file management function possessed by the printer management server 100 to set the time of the server printer 200. That is, a time can be set using a function usually possessed by a server such as WWW (World Wide Web), thus making it possible to relatively easily set the time of the server printer 200 without modifying the printer management server 100.

Furthermore, in this embodiment, when the network printer 200 receives a power-on instruction, it turns on the power of the network printer 200 itself, and sends the power-on instruction to a client printer 200 that is not started when the network printer 200 itself is the server printer 200.

In this way, all client printers 200 are powered on if only one network printer 200 becomes the server printer 200 unlike the conventional technique in which network printers 200 are individually powered on, and therefore the operation of turning the power becomes relatively easy.

Furthermore, in this embodiment, when the network printer 200 receives a power-off instruction, it turns off the power of the network printer 200 itself, and sends the power-off instruction to a client printer 200 that is powered on when receiving a power-off request if the network printer 200 itself is the server printer 200.

In this way, all client printers 200 are powered off by inputting the power-off request in only one of network printers 200 unlike the conventional technique in which network printers 200 are individually powered off, and therefore the operation of turning on the power becomes relatively easy.

Furthermore, in this embodiment, the operation state of the network printer 200 can be switched between the warm-up completion state and the sleep state, and the operation state of each network printer 200 is switched between the warm-up completion state and the sleep state so that any one of a plurality of network printers 200 is in the warm-up completion state when the network printer 200 itself is the server printer 200.

In this way, even if an abrupt print request is made to the network printer 200, the network printer 200 in the warm-up state can be used, and therefore no time is required for the network printer 200 to change its state from the sleep state to the warm-up state until print is completed. In addition, because all of the plurality of network printers 200 are in the sleep state except for one network printer 200, power conservation in the overall network is not significantly impaired. Thus, it is possible to achieve a relatively quick response to an abrupt print request while maintaining power consumption in the overall network.

Furthermore, in this embodiment, client printers 200 are grouped for each application, and when the network printer 200 itself is the server printer 200, the network printer sends a first state transition instruction or second state transition instruction to each client printer 200 so that any one of client printers 200 belonging to the same group is in the warm-up completion state.

In this way, even if an abrupt print request occurs for each application, the network printer 200 in the warm-up state can be used, and therefore no time is required for the network printer 200 to change its state from the sleep state to the warm-up state until print is completed. Thus, even if an abrupt print request occurs for each application, it is possible to achieve a relatively quick response to the print request.

Furthermore, in this embodiment, when the network printer 200 itself is the server printer 200, the network printer 200 notifies other client printers 200 of the printer operation state list 512 about the client printer 200 in the warm-up completion state.

In this way, in other client printers 200, when the printer operation list 512 is received, the client printer 200 in the warm-up completion state can be recognized by the received printer operation state list 512. Thus, for example, the user can be informed of the name, the location and the like of the client printer 200 in the warm-up completion state, and print data can be transferred to the client printer 200 in the warm-up completion state.

Furthermore, in this embodiment, the network printer 200 transfers the received print data to the client printer 200 in the warm-up completion state when the network printer 200 itself is not in the warm-up completion state, and performs printing based on the received print data when the network printer 200 itself is in the warm-up completion state.

In this way, when the user makes a request for print to any network printer 200, printing can be performed by the client printer 200 in the warm-up completion state. Thus, it is possible to achieve a relatively quick response while maintaining power conservation in the overall network.

Furthermore, in this embodiment, when print data is transferred, the network printer 200 notifies a user terminal of guide information about the client printer 200 to which print data is transferred.

In this way, in the user terminal, when guide information is received, the name, the location and the like of the client printer 200 in the warm-up completion state can be recognized.

Furthermore, in this embodiment, the network printer 200 notifies the user terminal of the printer operation state list 512 about the client printer 200 in the warm-up completion state when the network printer 200 itself is the server printer 200.

In this way, in the user terminal, when the printer operation state list 512 is received, the client printer 200 in the warm-up completion state can be recognized by the received printer operation state list 512. Thus, for example, the user can be informed of the name, the location and the like of the client printer 200 in the warm-up completion state, and print data can be sent to the client printer 200 in the warm-up completion state on a priority basis.

In the embodiment described above, the printer management server 100 corresponds to the device management terminal of aspects 2, 4, 12, to 14, 16, 19, 28, 30 and 33, and the accessed terminal of aspects 1, 10, 11 and 25, and the timing information registration table 410 corresponds to the access timing table of aspects 1, 2, 4, 8, 10, 12, 13, 24, 26 and 27. In addition, steps S152 and S154 correspond to timing information notifying section of aspects 1, 2, 4, 10, 12, 24 and 26, and the network printer 200 corresponds to the network device of aspects 2 to 7, 14 to 23, 28, 30, and 33 to 36, and the access terminal of aspects 1, 10, 11 and 24.

In addition, in the embodiment described above, the server printer 200 corresponds to the representative network device of aspects 2 to 4, 6, 8, 12 to 16, 19, 21, 26 to 29, and 33 to 35, and the client printer 200 corresponds to the dependent network device of aspects 2 to 7, 9, 12, 16 to 23, 26, and 30 to 37. In addition, the timing information registration table 550 corresponds to the second access timing table of aspects 3, 6, 9, 17, 18, 21, 23, 31, 32, 35 and 37, and the status information registration table 560 corresponds to first management information storing section of aspects 2 to 4, 6, 14, 15, 19, 21, 28, 29, 33 and 35.

In addition, in the embodiment described above, the status information registration table for collection corresponds to second management information storing section of aspects 2, 4, 16, 19, 30 and 33, and steps S606, S620, S626, S1308 and S1462 correspond to mode switching section of aspects 4, 19 and 33. In addition, step S1004 corresponds to timing information receiving section of aspects 1, 2, 4, 11, 16, 19, 25, 30 and 33, and steps S1052 and S1054 correspond to second timing information notifying section of aspects 3, 6, 7, 17, 21, 22, 31, 35 and 36.

In addition, in the embodiment described above, step S1100 corresponds to management information receiving section of aspects 2, 4, 16, 19, 30 and 33, step S1102 corresponds to management information registering section of aspects 2, 4, 5, 16, 19, 20, 30, 33 and 34, and steps S1152 and S1158 correspond to access section of aspects 1, 11 and 25. In addition, steps S1156 and S1158 correspond to second management information sending section of aspects 2, 4, 5, 16, 19, 20, 30, 33 and 34, and step S1404 corresponds to second timing information receiving section of aspects 3, 6, 15, 21, 29 and 35.

In addition, in this embodiment, steps S1456 and S1458 correspond to first management information sending section of aspects 2 to 4, 6, 14, 15, 19, 21, 28, 29, 33 and 35, and status information corresponds to management information of aspects 2 to 4, 6, 14 to 16, 19, 21, 28 to 30, 33 and 35.

In the embodiment described above, the printer management server 100 corresponds to the device management terminal of aspect 39, and the accessed terminal of aspect 38, the timing information registration table 410 corresponds to the access timing table of aspects 38, 39 and 41, and steps S152 and S154 correspond to the timing information notifying step of aspects 38 and 39. In addition, the network printer 200 corresponds to the network device of aspects 39, 40 and 43, and the access terminal of aspect 38, the server printer 200 corresponds to the representative network device of aspects 39 to 41 and 43, and the client printer 200 corresponds to the dependent network device of aspects 39, 40, 42 and 43.

In addition, in the embodiment described above, the timing information registration table 550 corresponds to the second access timing table of aspects 40 and 42, the status information registration table 560 corresponds to first management information storing section of aspects 39 and 40, and the status information registration table for collection corresponds to second management information storing section of aspect 39. In addition, steps S606, S620, S622, S1308 and S1462 correspond to the mode switching step of aspect 43, the step S1004 corresponds to the timing information receiving step of aspects 38 and 39, and steps S1052 and S1054 correspond to the second timing information notifying step of aspect 40.

In addition, in the embodiment described above, the step S1100 corresponds to the management information receiving step of aspect 39, the step S1102 corresponds to the management information registering step of aspect 39, steps S1152 and S1158 correspond to the access step of aspect 38, and steps S1156 and S1158 correspond to the second management information sending step of aspect 39. In addition, step S1404 corresponds to the second timing information receiving step of aspect 40, steps S1456 and S1458 correspond to the first management information sending step of aspects 39 and 40, and status information corresponds to management information of aspects 39 and 40.

Furthermore, in the embodiment described above, timing information notification processing at step S100 is configured such that a notification of timing information is made when a timing information acquirement request is received from the server printer 200, but the present invention is not limited thereto, and timing information notification processing may also be configured such that the printer management server 100 spontaneously notifies the server printer 200 of timing information.

In addition, in the embodiment described above, programs for carrying out processing shown in the flowcharts of FIGS. 16 to 38 are incorporated in the network printer 200 in advance, but the present invention is not limited thereto, and programs for carrying out processing shown in the flowcharts of FIGS. 16 to 38 may be registered in a printer program management server on the Internet 199, and the programs may be downloaded from the printer program management server and dynamically incorporated when the network printer 200 is connected to the sub-network 198.

In addition, in the embodiment described above, the network printer 200 is configured such that when the network printer 200 itself is the server printer 200, the network printer 200 compares the performance of the network printer 200 itself to the performance of the client printer 200, and if the network printer 200 determines that the performance of the client printer 200 is higher, it sends a server change request to the client printer 200 and sets the network printer 200 itself to the client printer 200, and when the network printer 200 receives the server change request, it sets the network printer 200 itself to the server printer 200, but the network printer 200 may also be configured such that the client printer 200 sends the server change request. That is, when the network printer 200 itself is the client printer 200, the network printer 200 compares the performance of the network printer 200 itself to the performance of the server printer 200, and if the network printer 200 determines that the performance of the network printer 200 itself is higher, it sends the server change request to the server printer 200 and sets the network printer 200 itself to the server printer 200, and when the network printer 200 receives the server change request, it sets the network printer 200 itself to the client printer 200.

In addition, in the embodiment described above, the server printer 200 sends server information to only the client printer 200, but the present invention is not limited thereto, and the server printer 200 may also be configured to send server information to the printer management server 100 as well. When the printer management server 100 receives server information, it updates the printer information registration table 400 based on the received server information.

In addition, the case where the timing information registration table 410 is updated has not been specifically described in the embodiment described above, but the printer management server 100 may also be configured such that if the number of server printers 200 increases, a date and time when access is started is specified repeatedly in the printer management server 100 as access timing for each server printer 200 so that access periods of server printers 200 do not overlap one another, and the timing information registration table 410 is updated.

In addition, the case where the timing information registration table 550 is updated has not been specifically described in the embodiment described above, but the server printer 200 may also be configured such that if the number of client printers 200 increases, a date and time when access is started is specified repeatedly in the server printer 200 as access timing for each server printer 200 so that access periods of client printers 200 do not overlap one another, and the timing information registration table 550 is updated.

In addition, in the embodiment described above, the operation state is controlled so that only one network printer 200 is in the warm-up completion state in the same sub-network 198, but the present invention is not limited thereto, and the operation state may be controlled so that a predetermined number of network printers 200 are in the warm-up completion state if a large number of network printers 200 exist in the same sub-network 198, or the like.

In addition, protocols for use in communication between the printer management server 100 and the server printer 200 have nor been specifically limited in the embodiment described above, but for example, HTTP (HyperText Transfer Protocol), FTP (File Transfer Protocol), mail protocols (SMTP (Simple Mail Transfer Protocol) and POP3 (Post Office Protocol version 3)) and other protocols may be used. If the mail protocol is used, the printer management server 100 is a mail server, and the server printer 200 sends a mail to the address of its own mail, and sets a time based on the time stamp of the mail received from the mail server. Even in this configuration, the time setting for the server printer 200 can be performed relatively easily without modifying the mail server.

In addition, in the embodiment described above, status information is collected from the network printer 200, but the present invention is not limited thereto, and status information and other management information may be collected from, for example, a network-compatible projector, scanner, digital camera, digital video camera, personal computer, PDA (Personal Digital Assistant), network storage, audio apparatus, cellular phone, PHS (Personal Handyphone System—registered trademark), watch-type PDA, STB (Set Top Box), POS (Point Of Sale) terminal, copier, facsimile apparatus, phone (including IP phone or the like), switchboard, NCU 'Network Control Unit'), router, hub, bridge or other network device, other than the network printer 200.

In addition, in the embodiment described above, the case has been described where control programs stored in the ROM 32 are executed in any case when processing shown in flowcharts of FIGS. 5 to 9 is carried out, but the present invention is not limited thereto, and programs may be read in the RAM 34 from a storage medium storing the programs indicating the procedures of processing and executed.

In addition, in the embodiment described above, the case has been described where control programs stored in the ROM 52 are executed in any case when processing shown in flowcharts of FIGS. 16 to 38 is carried out, but the present invention is not limited thereto, and programs may be read in the RAM 54 from a storage medium storing the programs indicating the procedures of processing and executed.

Here, the storage medium refers to semiconductor storage media such as RAMs and ROMs, magnetic memory storage media such as FDs and HDs, optical read-mode storage media such as CDs, CDVs, LDs and DVDs, and magnetic memory/optical read-mode storage media such as MOs, and includes any storage medium that is readable by a computer, irrespective of read modes such as electronic, magnetic and optical reading modes.

In addition, in the embodiment described above, the case has been described where the access control system, the accessed terminal, the access terminal and the program for terminal, and the access control method according to the present invention are applied to a network system comprised of Internet 199, but the present invention is not limited thereto, and they may be applied to so called an intranet in which communications are carried out in the same mode as in Internet 199, for example. As a matter of course, they may be applied to not only the network in which communications are carried out in the same mode as in Internet 199 but also usual networks.

In addition, in the embodiment described above, the case has been described where the access control system, the accessed terminal, the access terminal and the program for terminal, and the access control method according to the present invention are applied when status information is collected from a plurality of network printers 200 as shown in FIG. 1, but the present invention is not limited thereto, and they may be applied to other cases as long as there is no deviation from the sprit of the present invention.

The entire disclosures of Japanese Application Nos. 2003-003,141 filed Jan. 9, 2003 and 2003-358,374 filed Oct. 17, 2003 are incorporated by reference.

What is claimed is:

1. An access control system comprising:
a first network device group including a first representative network device and one or more dependent network devices;
a second network device group including a second representative network device and one or more of said dependent network devices; and
a device management terminal managing said network devices;
said first network device group, said second network device group and said device management terminal being connected so that communications can be carried out, said first and second representative network devices collect management information of a plurality of network devices including themselves in network device groups to which the representative network devices belong, and the management information collected by said first and second representative network devices is collected by said device management terminal;
wherein said device management terminal comprises:
an access timing table defining access timing for each of said representative network devices so that access from said first and second representative network devices to the device management terminal is dispersed; and
a timing information notifying section notifying the representative network device of timing information indicating access timing corresponding to said representative network device with reference to said access timing table;
wherein said dependent network devices comprise:
a first management information storing section storing management information of the network device itself; and
a first management information sending section sending management information of said first management information storing section to the representative network device of the network device group to which the network device itself belongs; and
wherein said representative network devices comprise:
a second management information storing section stpring management information of said representative network devices and said dependent network devices;
a management information receiving section receiving said management information;
a management information registering section registering in said second management information storing section the management information received by said management information receiving section;
a timing information receiving section receiving said timing information; and
a second management information sending section sending management information of said second management information storing section to said device management terminal based on the timing information received by said timing information receiving section.

2. The access control system according to claim 1, wherein:
said first and second representative network devices each comprise:
a second access timing table defining access timing for each dependent network device so that access by said dependent network devices of the network device group to which the network device itself belongs is dispersed; and
a second timing information notifying section notifying the dependent network device of timing information indicating access timing corresponding to said dependent network device with reference to said second access timing table;
said dependent network device further comprises a second timing information receiving section receiving said timing information; and
said first management information sending section sending management information of said first management information storing section to the representative network device of the network device group to which the network device itself belongs based on the timing information received by said second timing information receiving section.

3. The access control system according to claim 2, wherein:
said access timing table defines as said access timing a at least one of a date and a time when access is started for said each representative network device so that access periods of said representative network devices do not overlap one another.

4. The access control system according to claim 2, wherein:
said second access timing table defines as said access timing at least one of a date and a time when access is started for said each dependent network device so that access periods of said dependent network devices do not overlap one another.

* * * * *